US012236736B2

(12) United States Patent
Schoenfelder et al.

(10) Patent No.: US 12,236,736 B2
(45) **Date of Patent: *Feb. 25, 2025**

(54) SMART ACCESS CONTROL DEVICE

(71) Applicant: Latch Systems, Inc., New York, NY (US)

(72) Inventors: Luke Andrew Schoenfelder, New York, NY (US); Michael Brian Jones, New York, NY (US); Tracy Van Dyk, New York, NY (US); Sage Wright, Brooklyn, NY (US); Euan Scott Foster Abraham, San Francisco, CA (US); Kevin Chen, New York, NY (US); Aaron Sirken, New York, NY (US)

(73) Assignee: Latch Systems, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,787

(22) Filed: Jun. 1, 2023

(65) Prior Publication Data

US 2024/0005717 A1 Jan. 4, 2024

Related U.S. Application Data

(63) Continuation of application No. 17/833,175, filed on Jun. 6, 2022, now Pat. No. 11,676,437.

(60) Provisional application No. 63/279,453, filed on Nov. 15, 2021.

(51) Int. Cl.
*G07C 9/29* (2020.01)
*G07C 9/00* (2020.01)

(52) U.S. Cl.
CPC ........... *G07C 9/29* (2020.01); *G07C 9/00182* (2013.01)

(58) Field of Classification Search
CPC .............................. G07C 9/29; G07C 9/00182
See application file for complete search history.

(56) References Cited

U.S. PATENT DOCUMENTS

| | | | |
|---|---|---|---|
| 2016/0241999 | A1 | 8/2016 | Chin |
| 2017/0228953 | A1 | 8/2017 | Lupovici |
| 2018/0135337 | A1 | 5/2018 | Johnson |
| 2020/0314651 | A1 | 10/2020 | Pirch |
| 2020/0351101 | A1 | 11/2020 | Becker |
| 2021/0142601 | A1 | 5/2021 | Schoenfelder |
| 2021/0225100 | A1 | 7/2021 | Jones |
| 2022/0229654 | A1 | 7/2022 | Bliding |

FOREIGN PATENT DOCUMENTS

| | | |
|---|---|---|
| CN | 207017817 | 2/2018 |
| WO | 2005041131 A2 | 5/2005 |

OTHER PUBLICATIONS

International Preliminary Report on Patentability for International Application No. PCT/US2022/048430, mailed May 30, 2024, 15 pages.

*Primary Examiner* — Nabil H Syed
(74) *Attorney, Agent, or Firm* — KDW Firm PLLC

(57) ABSTRACT

Embodiments are directed to systems and techniques to provide smart access control devices with legacy access control systems.

20 Claims, 15 Drawing Sheets

SMART ACCESS CONTROL DEVICE

CROSS-REFERENCE

This application claims priority to U.S. patent application Ser. No. 17/833,175, filed on Jun. 6, 2022, and entitled "SMART ACCESS CONTROL DEVICE", and U.S. Provisional Patent Application Ser. No. 63/279,453, filed on Nov. 15, 2021, and entitled "SMART ACCESS CONTROL DEVICE." The contents of the aforementioned applications are hereby incorporated by reference in their entirety.

BACKGROUND

A traditional access control system is architected around a reader, an access control panel, and an electronic door activating hardware device. The readers receive credentials from users and transmit the received credentials to the access control panel. The access control panel stores a preset list of authorized credentials and checks the information passed from the reader against the preset list of authorized credentials to determine whether that user is authorized to perform its desired action, e.g., be allowed access to a particular area. If it is determined that the user is authorized to perform its desired action, the access control panel can unlock the electronic door activating hardware.

Traditional access control systems lack support for the rapid management of users and the provisioning of access to guests because all the authorized credentials must be synced with the access control panel. This process of synching the credentials can involve numerous steps of human involvement on the part of building management and the access or security management company. The process can involve modifying multiple pieces of software for the actual updating of the access control panel and can also involve updating the different ways of communicating and updating access information for owners, users, and guests. Moreover, an upgrade to the reader can require substantial changes to the underlying system.

In addition, replacing access control systems is an expensive process. Building managers and owners are hesitant to install new systems despite the benefits of mobile credentials and simplified guest access due to hassle and cost. Existing simple to install systems still involves touching wiring (crimping onto or cutting existing wiring) and drilling holes. This is a big barrier to less technically inclined users that do not want to disrupt their current system. These systems are also not expandable to large buildings or offices.

BRIEF SUMMARY

In one aspect, a smart access control device is configured to enable users to gain access to spaces utilizing upgraded technology while operating with a backend legacy access control system. Embodiments may include a smart access control device configured to be implemented and installed with a legacy access control system with little or no professional installation required. In one example, the smart access control device may be configured to be installed on and/or near a legacy access control reader. The smart access control device is then configured to receive and authenticate one or more credentials from devices, such as mobile devices, pin codes, access cards, or fobs. If authenticated, the access device is further configured to generate an emulation signal, including a legacy credential to communicate to the legacy access control system via a legacy access control reader. The emulation signal may be communicated to the legacy access control reader via one or more wireless signals sent to a legacy access control system for processing to gain access to a space. These and other details will become more apparent in the following description.

BRIEF DESCRIPTION OF THE SEVERAL VIEWS OF THE DRAWINGS

By way of example, embodiments of the disclosure will now be described, with reference to the accompanying drawings, in which.

Figure 1B:
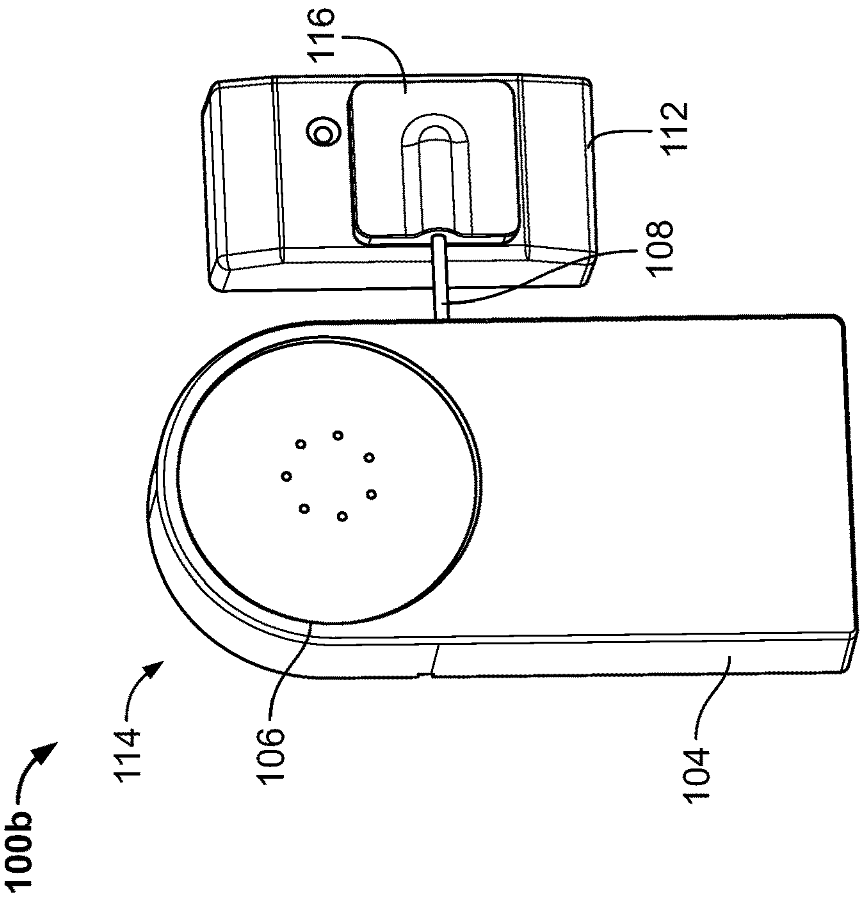
FIG. 1B illustrates an example of a system 100*b* in accordance with embodiments.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

DETAILED DESCRIPTION

Embodiments discussed herein include a smart access control device that may be implemented into an existing access control system, such as a radio frequency identification (RFID) or other legacy access control system, by emulating previously used credential(s) or a newly configured credential entered into the legacy access control system to grant access to a door or space. The smart access control device can be mounted and set up without professional installation. The device may be installed without removing any existing devices and may be installed in minutes without drilling holes or running cables through walls. Nothing needs to be installed on the inside of the door or connected to other devices' wiring to function. Thus, embodiments are advantageous over existing upgrade solutions that require an installer to remove hardware, expose wiring, connect to wiring, drill holes, and so forth.

The smart access control device allows the user to use their phone, a near-field communication (NFC) device, a smart access card, a fob, enter a pin code, etc., to authenticate themselves by communicating a credential that is compared to a new credential stored on the smart access control device. The smart access control device may be configured to receive the credential wirelessly in accordance with wireless protocols, such as NFC, Bluetooth, including Bluetooth Low Energy (BLE), RFID, ZigBee, Infrared, etc. When authenticated, the smart access control device emulates a legacy wireless signal including data, such as a credential, that is known to the existing access control system, which unlocks an access point, such as a door. The smart access control device is also configured to harvest power from the preexisting system to extend the battery life of the smart access control device for lower maintenance costs and convenience.

In some embodiments, the smart access control device includes three main components, the mounting plate which attaches the smart access control device to the wall or other surface, a control unit including one or more printed circuit boards (PCBs) having processing, storage components, and communication devices (See, e.g., FIG. 4A), a user interface, and a satellite module which attaches and/or couples to the existing access control reader and consists of one or more coils for wireless emulation and power harvesting. The smart access control device, in embodiments, can be attached to the wall or surface via double-sided tape, such as VHB® tape, that is pre-installed on the backplate, glue which can be applied to a channel on the back of the mounting plate, via strong weatherproof glue, or via screws. This allows smart access control devices to be easily and securely mounted onto a wide variety of mounting scenarios and surfaces.

Figure 2A:
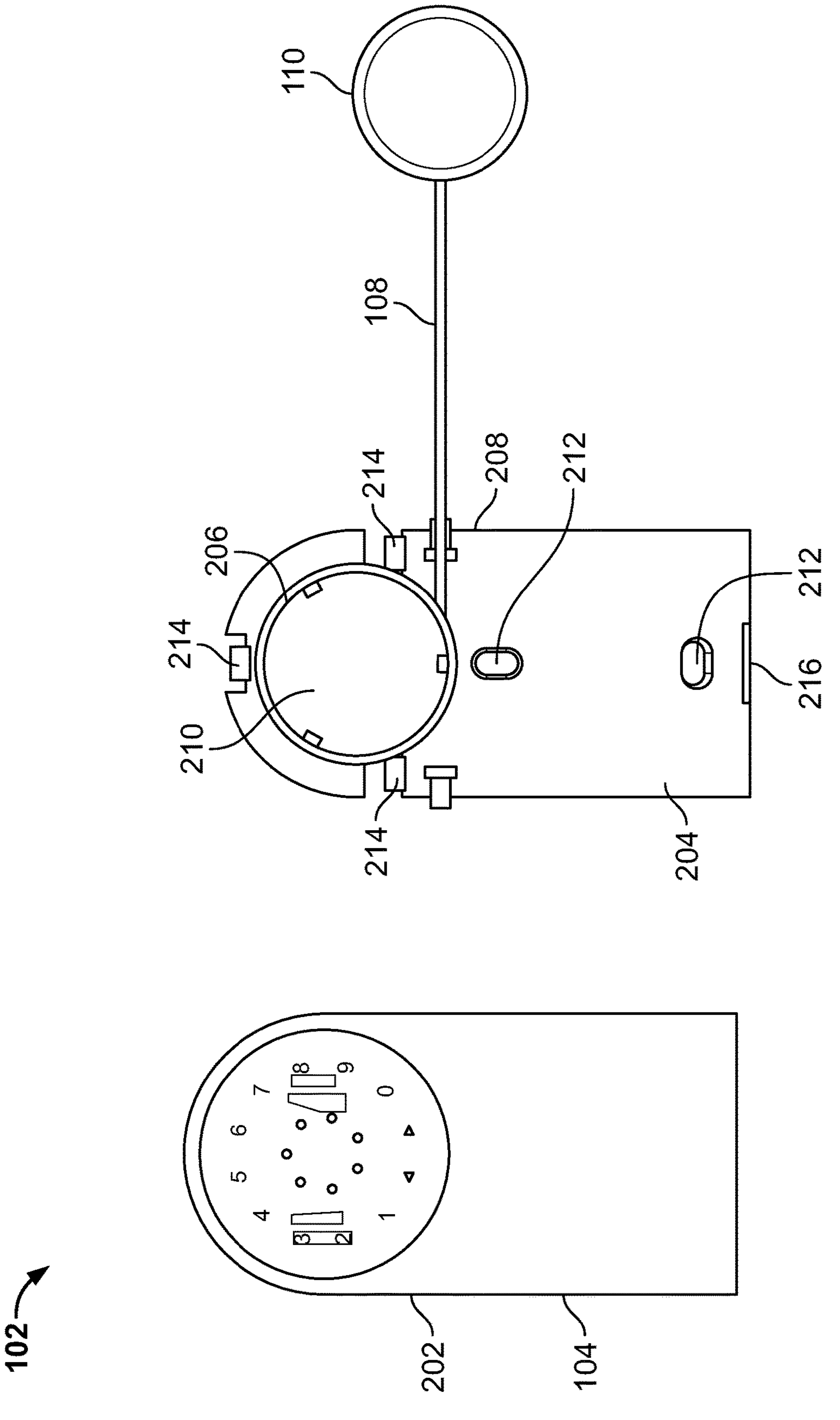
FIG. 2A illustrates an aspect of the smart access control device 102 in accordance with embodiments.
Figure 2B:
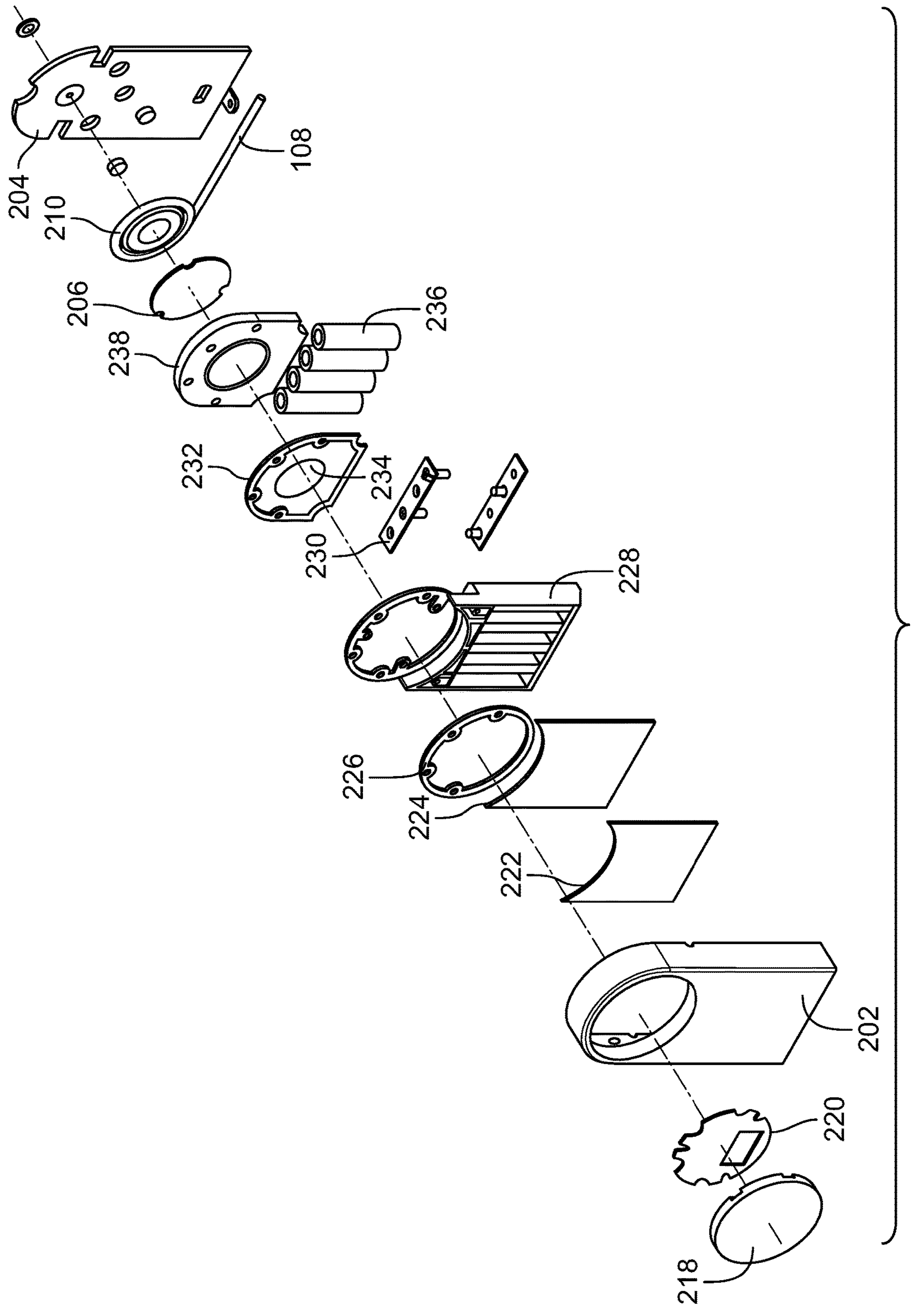
FIG. 2B illustrates an aspect of the smart access control device 102 in accordance with embodiments.

In embodiments, the control unit includes a smart module, such as the "lens" control module (please see FIG. 2B and the U.S. patent application Ser. No. 17/145,952 (United States Publication Number U.S. 2021-0225100 A1), titled "Universal Smart Interface For Electronic Locks"—which is herein incorporated by reference), a battery (e.g., four A.A. lithium primary (non-rechargeable) batteries), a power harvesting PCB, and a mechanical housing and sealing. In embodiments, there is a cable that attaches the smart satellite module to the main housing of the smart access control device. In some instances, the cable can detach from the main housing, and an internal coil will emulate the credential and harvest power. The entire smart access control device assembly is weatherproof and able to function in outdoor environments. In some instances, the smart access control device can be powered by wall power or a solar panel and may or may not utilize rechargeable batteries or supercapacitors.

In the instance when the smart access control device is used with the satellite module, the system may include up to three coils (e.g., short-range antennas) to wirelessly emulate the RFID credential as well as harvest power. One coil resides inside the satellite module, one coil resides on the backplate, and the third coil resides inside the control unit itself. In this configuration, the front plate, including the main control unit (PCBs), may be removed from the backplate to change batteries without having to unplug or disturb any wiring (See, e.g., FIGS. 2B, 2D, 3A, and 3B). All that needs to be done to remove the front plate from the wall is to unscrew a security screw that can be located at the bottom of the unit. The front plate and the main control unit may be removed from the wall while the mounting plate and satellite device stay attached.

The smart access control device can be installed on a wide variety of surfaces and install scenarios, and the cable enables the main unit to install in various locations relative to the satellite module. The cable can be spooled onto the backplate (or in some instances, the satellite module) to manage the cable and hide excess. This allows for the optionality of different placement of the main unit on a wall with intercoms, readers, key boxes, etc., already installed. In some instances of the product, there is no satellite module, and the smart access control device includes an internal coil for emulation placed within a close distance of the existing access reader.

In some embodiments, the smart access control device may include a plaque that may be used to hide legacy access control devices and a satellite module. The plaque can include information, such as instructions to scan a device. In embodiments, the plaque can be made to be Americans with Disabilities Act (ADA) compliant, including braille instructions. The plaque may also include additional features, such as a Q.R. code and NFC tag to pull up a virtual intercom on the user's phone, as previously discussed in the U.S. patent application Ser. No. 17/085,160 (United States Patent Publication Number U.S. 2021-0142601 A1), titled "Smart Building Integration and Device Hub"—which the entire contents are herein incorporated by reference. As discussed in the U.S. patent application Ser. No. 17/085,160, the virtual intercom is used to unlock a smart access control device for a guest or delivery. The plaque can be installed both vertically and horizontally by switching the positioning of the retaining brackets. The brackets can be attached to the wall via VHB tape, glue, or screws. The height of the brackets is intended to give clearance to cover the existing access control reader and the satellite module. In some instances, the plaque can also be taped, glued, or screwed flat onto the wall without brackets.

In operation, the smart access control device may be installed and programmed to operate with the legacy smart access system. For example, the smart access control device may first perform a password-protected secure setup routine to determine the information to operate with the legacy smart access system. Specifically, the smart access control device may determine authentication information (e.g., one or more credentials), protocols, data formats, etc., that enables the smart access control device to emulate signals and data of a legacy access reader. The smart access control device may deploy a number of methods to read and/or receive the information from the legacy access system to determine the information. For example, the smart access control device may be put into the setup mode, which may include a "card read" mode that causes the satellite module to perform one or more read operations to read the authentication data from a legacy access card or FOB containing a credential that unlocks the existing system. The smart access control device will read data from the card via the satellite module and store the credential in a secure memory for easy installation and seamless operation. The smart access control device will determine the protocol and data format utilized during the read operation for the legacy access system. In some instances, the read operation may be performed by a coil of the main unit to read the authentication data. In another example, a user may manually enter the authentication information using an interface of the smart access control device while in the setup routine. In a third example, the smart access control device may communicate with another device, such as a mobile device or a remote computer, to determine the information. Embodiments are not limited to these examples.

The smart access control device may also be programmed with one or more new credentials while in the setup routine that may be authenticated by the smart access control device prior to emulating the legacy authentication data. For example, the smart access control device may be programmed with one or more credentials that may be provided by a user via a mobile device, a user input, an access card, a fob, etc., to gain access to the space. The smart access control device may store the new authentication information in a secure memory location and use the information to perform authentication operations when users are attempting to gain access to the space. In other instances, the smart access control device may be configured to communicate with a remote system having a database or storage structure having new credentials to perform authentication of users, and embodiments are not limited in this manner.

In an operation mode, the smart access control device is configured to authenticate users and communicate with the legacy access system to gain access to a space. For example, the smart access control device is configured to receive authentication information from a device, such as a mobile phone, via short-range communication. The authentication information may include a credential to authenticate a user. The smart access control device may compare the credential to authenticated credentials to authenticate the user, for example. If authenticated, the smart access control device may generate or retrieve legacy authentication information, e.g., a legacy credential, to communicate in an emulated signal to a legacy access reader. Specifically, the smart access control device may cause the satellite module to communicate, via a short-range antenna, a signal including the legacy credential that can be detected by the legacy access reader. The signal may be communicated in a protocol and format acceptable by the legacy access reader. The legacy access reader may send the received information to the access control system to authenticate and provide access to a space via controlling a lock or locking mechanism coupled with a door. Embodiments are not limited to this example. These and other details will be discussed in the following description.

Reference is now made to the drawings, wherein reference numerals are used to refer to like elements throughout. In the following description, for purposes of explanation, numerous specific details are set forth in order to provide a thorough understanding thereof. However, the novel embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1A:
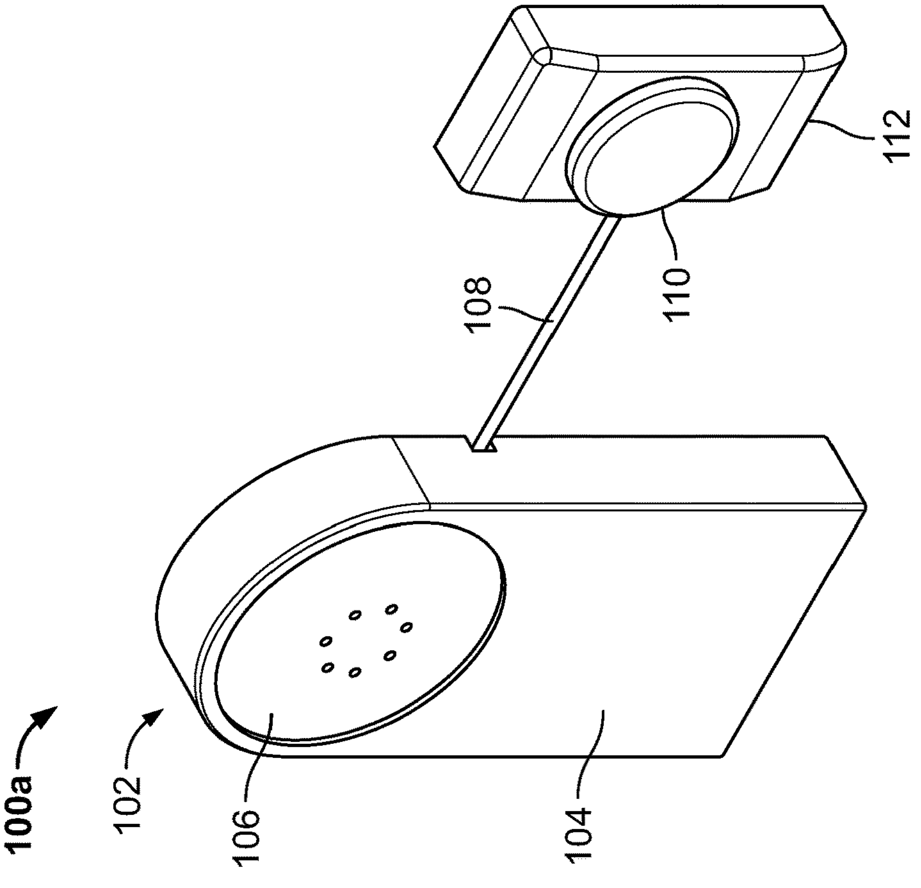
FIG. 1A illustrates an example of a system 100*a* in accordance with embodiments.

FIG. 1A illustrates an example of a system **100*a* in accordance with embodiments discussed herein. System 100*a* includes a smart access control device 102 and a legacy access control device 112. The smart access control device 102 includes components configured to authenticate authentication information provided by users and emulate data and signals that can be read by the legacy access control device 112, which may be a legacy card reader. In embodiments, the smart access control device 102 includes a control module 104 having an interface 106, a cable 108, and a satellite module 110. FIG. 1B illustrates a second example of a system 100*b*, which is similar to system 100*a* in design and function. However, as will be discussed in more detail in the following description, the smart access control device 114 and satellite module 116 may include minor differences. For example, as illustrated, the satellite module 116** may have a square form instead of a circular form.

Figure 4A:
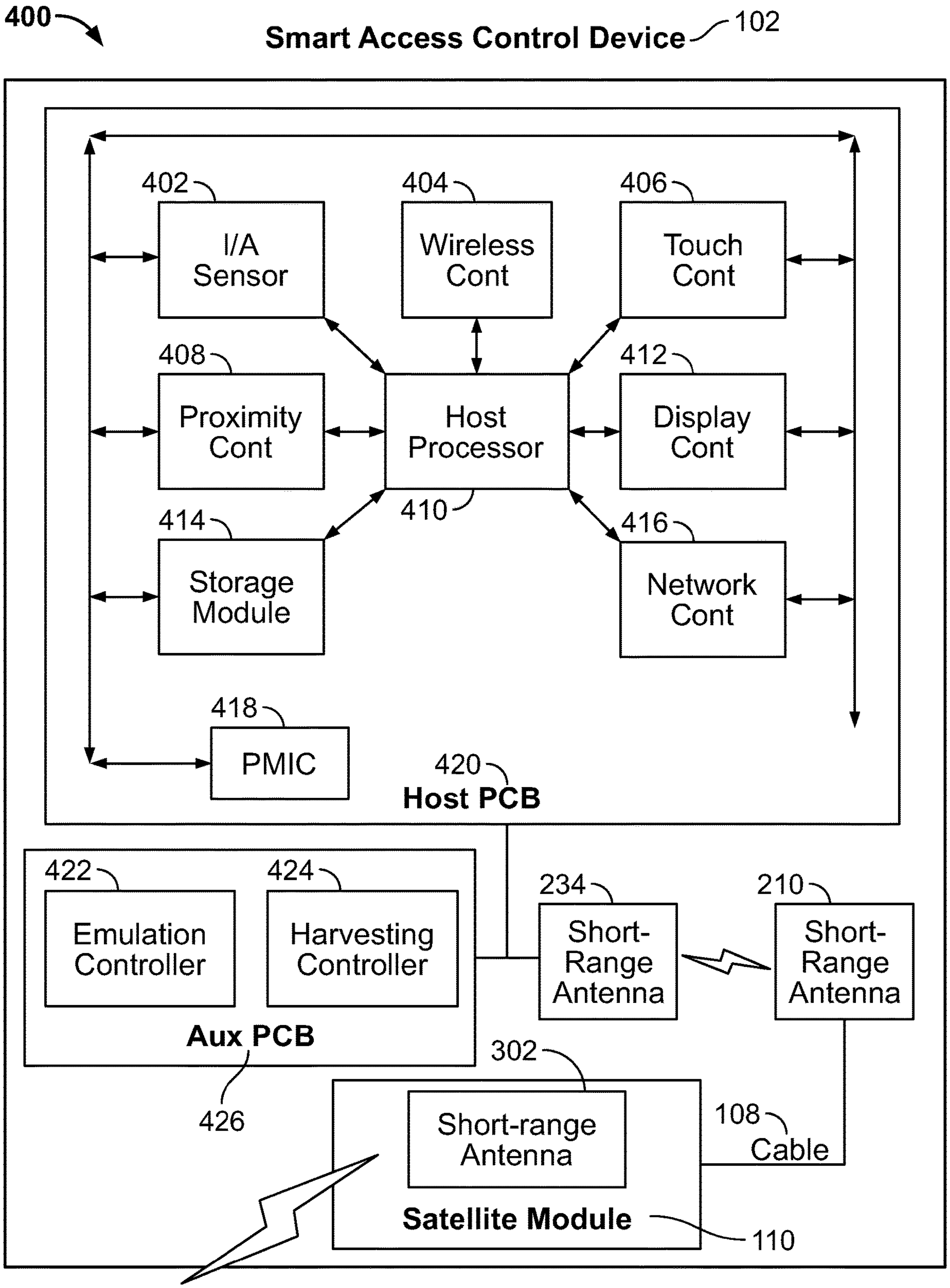
FIG. 4A illustrates an aspect of the system diagram 400 in accordance with embodiments.

The control module 104 may include the main control or host unit, controllers, and at least one short-range antenna, such as an NFC coil. FIG. 4A illustrates the components of the control module 104 implemented on a host PCB 420 and an aux PCB 426. The control module 104 controls various aspects of the smart access control device 102, including providing a setup mode of operation to configure the smart access control device 102 to operate in the legacy access system and an operation mode to enable users to access a space controlled by the legacy access system.

In embodiments, the control module 104 may be coupled with the satellite module 110 via a cable 108. The cable 108 may be any type of data cable configured to communicate data. For example, the cable 108 may be a two-conductor shielded cable having a first end coupled with a short-range antenna in the control module 104 and another end coupled with a short-range antenna in the satellite module 110. The gauge, type, size, shielding, etc., of the cable 108 may be determined based on the requirements to communicate signals between the two short-range antennas for specified distances. In some instances, the cable 108 may include security features, including a strengthened outer layer or shell for the cable or strengthened internal wire to prevent damage or vandalism that someone may perform on the cable 108.

The control module 104 may also include an interface 106, which may be any type of interface, such as a touch-sensitive interface described in the U.S. patent application Ser. No. 17/145,952. In embodiments, the interface 106 enables a user to interface with the smart access control device 102. For example, the interface 106 may enable a user to enter a credential or code that may be used by the smart access control device 102 to authenticate the user to gain access to a space. The interface 106 may enable a user to perform other operations for the smart access control device 102, including putting the smart access control device 102 into a setup mode and/or into the operational mode. For example, the user may enter a code into the interface 106 to enter the setup mode for the smart access control device 102. The user may also use the interface 106 to exit the setup mode and/or put the smart access control device 102 into the operational mode. In embodiments, the control module 104 may be set up and configured via other means. For example, the control module 104 may receive one or more instructions from another device via a wired connection (e.g., serial, cat 5/6, USB, FireWire, etc.) and/or wireless connection (BLE, NFC, IEEE 802.11, ZigBee, etc.). Embodiments are not limited in this manner.

In setup mode, the smart access control device 102, including the control module 104 may determine authentication information (e.g., one or more credentials), protocols, data formats, etc., that enables the smart access control device 102 to emulate signals and data of legacy access control device 112. As discussed, the smart access control device 102 may read a legacy device or card via the satellite module 110. The legacy authentication data may be provided by the satellite module 110 to the control module 104 via the cable 108, coupling the control module 104 with the satellite module 110. The control module 104 may securely store the data in storage or memory. In some instances, the smart access control device 102 may also be configured to perform a read operation utilizing one of the short-range antennas located in the housing of the control module 104 to determine legacy authentication information. In a third example, a user may enter the legacy authentication information using the control module 104. Embodiments are not limited in this manner.

In operation, the smart access control device 102 may be configured to receive new credentials from devices, such as mobile devices. The new credentials may be authenticated by the smart access control device 102 either locally or by communicating with one or more remote devices. In some instances, the new credentials cannot be authenticated by the legacy access control system. The smart access control device 102, including the control module 104 is configured to emulate data based on the legacy authentication information determined during the setup to gain access to a space. For example, the control module 104 may generate legacy authentication information which includes one or more signals configured to communicate a credential known to the legacy access control system using a protocol and data format that can be read by the legacy access control device 112. Specifically, the control module 104 may communicate one or more signals via the cable 108 to the satellite module 110, having a short-range antenna. The short-range antenna may emit the one or more signals which may be detected and/or read by the legacy access control device 112 and provided to the legacy access control system for authentication and to gain access to a space.

The smart access control device 102, including the control module 104 and the satellite module 110, may also be configured to harvest energy from the legacy access control device 112. The satellite module 110 may include a short-range antenna configured to energize in the presence of an energy field generated by the legacy access control device 112. Power may be provided through the cable 108, coupling the control module 104 to the satellite module 110. The control module 104 may include components such as a harvesting controller 424 and PMIC 418 illustrated in FIG. 4A, configured to utilize the power to operate other components of the smart access control device 102. The harvested power may be used to supplement the power provided by the battery extending the operational lifetime of the battery or power the smart access control device 102 without the need for batteries. In the illustrated example, the satellite module 110 has a circular. However, embodiments are not limited in this manner, e.g., the satellite module 110 may include a rectangular form. In another example, the satellite module 110 may take the form of the legacy access control device 112 such that it may be placed on top of the legacy access control device 112 to hide the original housing. Thus, a user will not notice the satellite module 110 on the legacy access control device 112. In some embodiments, the housing of the satellite module 110 may snap using one or more fasteners or clips onto the legacy access control device 112. In other instances, the housing of the satellite module 110 may replace the housing of the legacy access control device 112. Embodiments are not limited to these examples. In some instances, the control module 104 and the satellite module 110 may be within a single housing. The single housing may be configured to house all of the components; and, in some instances, snap or fasten over the legacy access control device 112. Embodiments are not limited in this manner.

FIG. 2A illustrates an example configuration of the smart access control device 102, including the control module 104. Specifically, the control module 104 may include a faceplate 202 and a mounting plate 204. The mounting plate 204 may include a number of screw holes 212 that may be used to mount the control module 104 to a wall or surface. The mounting plate 204 may also include grooves (not shown) on the backside to accept glue and/or adhesive that may be used to mount the control module 104. In one example, the mounting plate 204 may be adhered to a wall or surface using any type of adhesive, such as VHB tape.

The mounting plate 204 also includes a spool 206 that may be used to wrap excess cable 108 around that is not in use. The spool 206 design allows users to adjust the length of exposed cable to precisely fit a variety of installation scenarios, ranging from 0.5" up to 12", for example. The unused cable is wound up on the puck behind the product, hidden from view, providing a clean aesthetic in every installation. The puck is also user-replaceable should the exposed cable or satellite get damaged through vandalism. Embodiments are not limited to a specific cable length, and 0.5" to 12" are provided for exemplary purposes.

The mounting plate 204 may also include a short-range antenna 210, such as an RFID coil. In some instances, the short-range antenna 210 may be located and affixed to a center portion of the spool 206. In some embodiments, short-range antenna 210 may be coupled with the cable 108 electrically and physically via one or more connectors, and signals may be communicated between the short-range antenna 210 and the satellite module 110 via the cable 108.

The mounting plate 204 may include one or more through-hole 208 that may be configured to provide the cable through to the satellite module 110. In embodiments, the mounting plate 204 may include through-hole 208 on each side such that the cable 108 may exit the mounting plate 204 on the left or right side of the mounting plate 204.

In embodiments, the mounting plate 204 may include one or more clips 214 configured to engage a receiving portion of the faceplate 202 to form a housing to store the components of the smart access control device 102, as illustrated in FIG. 3. The mounting plate 204 may include a tab 216 configured to accept a set screw to lock the faceplate 202 to the mounting plate 204 to secure the components of the control module 104. In embodiments, the faceplate 202 may engage the clips 214 of the mounting plate 204 and lock into place via a set screw or other locking mechanism provided in tab 216.

The faceplate 202 and the mounting plate 204 may form a housing for the control module 104 and components, as illustrated in FIG. 2B. The housing may form a cavity to store the components of the control module 104, including the batteries 236 in a carrier 228 having battery contacts 230. In embodiments, the faceplate 202 may include a circular cutout portion configured to accept the lens 218 and the PCB 220. In one example, the lens 218 may include the electronics and components of PCB 420 and the PCB 220 may include the electronics and components of the AUX PCB 426 in FIG. 4A.

The faceplate 202 may include a cavity configured to accept a label 222 for the battery, a battery PSA 224, and the carrier 228. As mentioned, the batteries 236 may be provided in the carrier 228 in accordance with the battery contacts 230. The lens 218 may be held onto the faceplate 202 via one or more screws or fasteners provided through a backplate 238. The fasteners may be configured to engage the lens 218 through holes provided in the backplate PSA 232, the carrier 228, the lens PSA 226, and the PCB 220. In embodiments, the fasteners are configured to hold the backplate PSA 232, the carrier 228, the lens PSA 226, and the PCB 220 in place when securely attached to the lens 218.

In embodiments, the PCB 220, including one or more of the components, may physically and/or electrically engage the 226 and the backplate PSA 232. In one example, the backplate PSA 232 may include a short-range antenna 234, such as an NFC coil, that may be physically coupled with one or more components on the PCB 220. As will be discussed in more detail below, the short-range antenna 234 in the faceplate 202 enables a user to remove the faceplate 202 from the mounting plate 204 without detaching or dealing with any wires to couple with the cable 108.

In embodiments, the mounting plate 204 may include the short-range antenna 210 (e.g., the RFID mounting plate coil), and the spool 240. The spool 240 may secure the short-range antenna 210 to the mounting plate 204. The short-range antenna 210 may be coupled with the cable 108, as previously discussed, and excess cable 108 may be wrapped around and stored on the spool 206.

The short-range antenna 210 may be configured to communicate with the satellite module 110, as previously discussed, and with components of the PCB 220 via the short-range antenna 234, as will be discussed in more detail in FIGS. 3A and 3B.

Figure 2C:
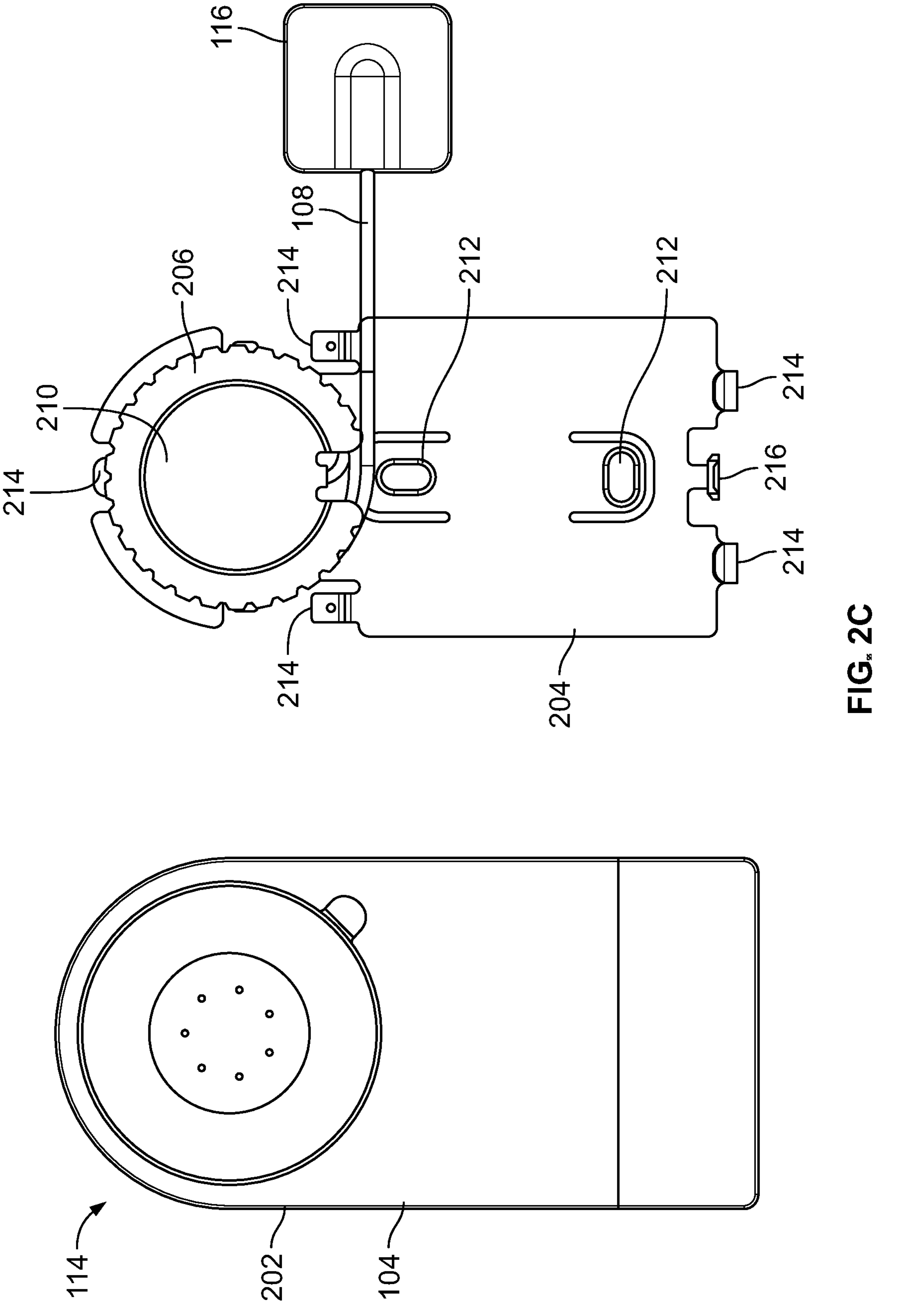
FIG. 2C illustrates an aspect of the smart access control device 102 in accordance with embodiments.
Figure 2D:
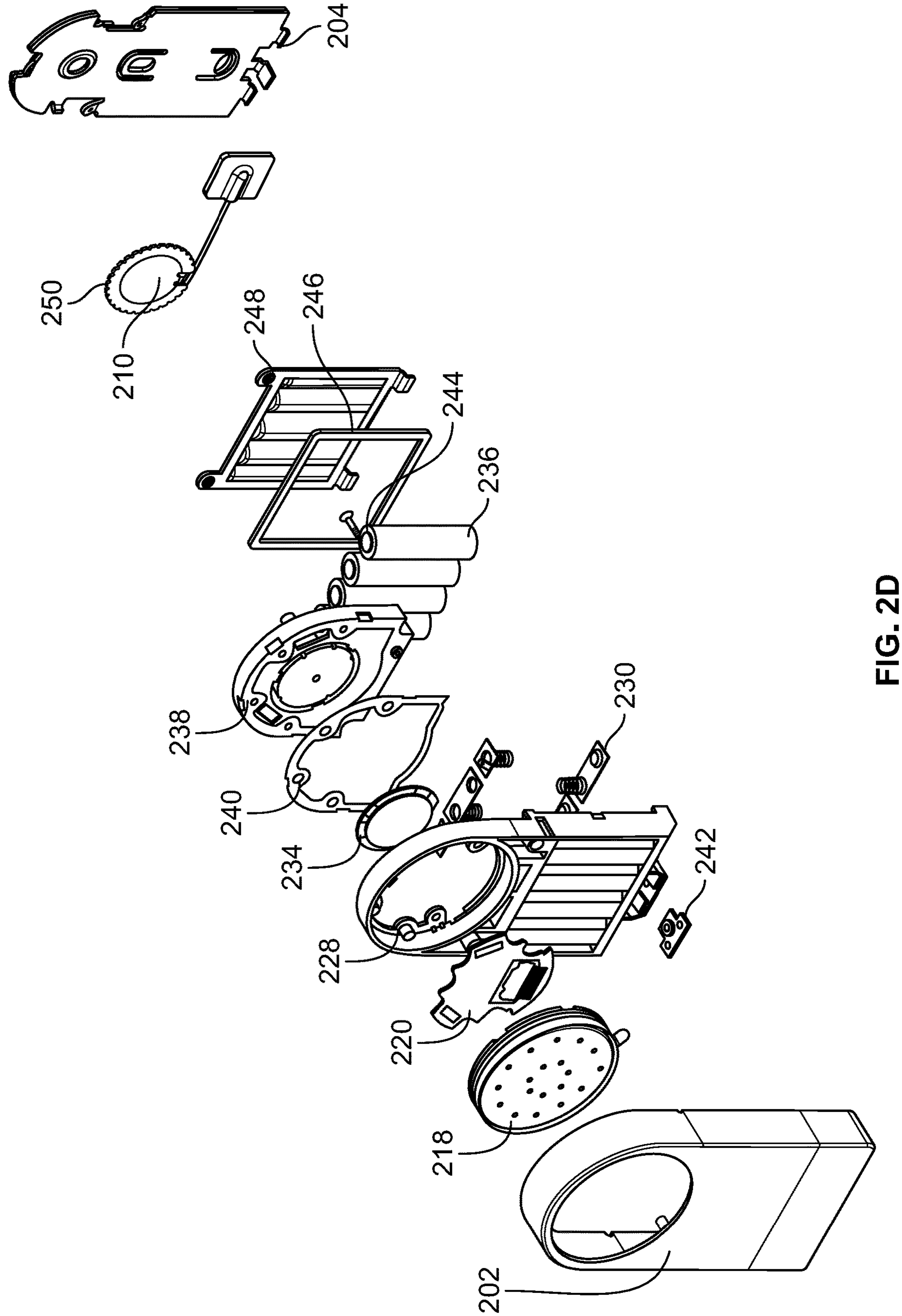
FIG. 2D illustrates an aspect of the smart access control device in accordance with embodiments.

FIGS. 2A and 2B illustrate one configuration of the access control device and satellite module. FIGS. 2C and 2D illustrate a second example configuration of the access control device and satellite in accordance with embodiments discussed herein. Similarly, the FIG. 2C illustrates a smart access control device 114, including a control module 104 having a faceplate 202. The configuration is illustrated in FIG. 2C includes a mounting plate 204. Again, the mounting plate 204 may include a number of screw holes 212 that may be used to mount the control module 104 to a wall or surface or the mounting plate 204 may be fastened via glue or adhesive, such as VHB tape.

The mounting plate 204 also includes a spool 206 that may be used to wrap excess cable 108 around that is not in use. In embodiments, the spool 206 may include a circular groove that may accept a number of wraps of the cable 108 around it. In the illustrated example, the spool 206 may have a number of ridges on the outer edge of the spool. The mounting plate 204 may also include a short-range antenna 210, such as an RFID coil, which may be coupled with the cable 108 electrically and physically via one or more connectors, and signals may be communicated between the short-range antenna 210 and the satellite module 110 via the cable 108.

In embodiments, the mounting plate 204 may include one or more clips 214 configured to engage a receiving portion of the faceplate 202 to form a housing to store the components of the smart access control device 102. In the illustrated example, the mounting plate 204 includes two additional clips 214 at the bottom to provide additional securing points over the illustrated example in FIG. 2A. The mounting plate 204 may also include a tab 216 configured to accept a set screw to lock the faceplate 202 to the mounting plate 204 to secure the components of the control module 104. In embodiments, the faceplate 202 may engage the clips 214 of the mounting plate 204 and lock into place via a set screw or other locking mechanism provided in tab 216.

The faceplate 202 and the mounting plate 204 may form a housing for the control module 104 and components, as illustrated in FIG. 2D. FIG. 2D illustrates an exploded view of the components of the smart access control device 114 and the control module 104. In the illustration, the control module 104 includes the faceplate 202, which may include a cavity to accept the components of the module. As illustrated, the faceplate 202 may have a shape that has a square bottom and a circular top. The circular top portion may include a hole to accept the lens 218, or touch interface, of the control module. Behind the lens 218, the control module 104 includes the PCB 220, which includes the processing and memory components to perform the operations discussed herein including emulation and power harvesting.

In embodiments, the lens 218 and the PCB 220 may be secured and held in place to the faceplate 202 via the carrier 228 and the backplate 238. The carrier 228 may also include a hole or 'socket' to accept and secure a screw plate 244 configured to accept a screw insert in the tab of the mounting plate 204. The opposing side of the carrier 228 may also include a cavity that may be formed and configured to securely hold the battery contacts 230. The battery contacts 230 may include a top battery contact and a bottom contact and configured to, in this illustrated example, 4 A.A. lithium-ion batteries.

In embodiments, the backplate 238 may be configured to securely attach to the faceplate 202 through the carrier to 'sandwich' the lens 218, the PCB 220 to one side of the carrier 228 at top portion of the carrier 228. The backplate 238 may also secure the short-range antenna 234 in the cavity of the carrier 228. A chassis VHB 242 material may be placed between the carrier and the backplate 238 to ensure that the backplate 238 is securely attached to the carrier 228.

The bottom portion of the carrier 228 may house the batteries 236 that may be securely held in place by a battery door 250. The battery door 250 may be attached to the bottom portion of the carrier 228 via one more battery door screws 246. In some instances, a battery door seal 248 may be used to prevent water and other particulates from entering the battery cavity.

The control module 104 also includes another short-range antenna 210 coupled with the satellite module. The short-range 210 may be coupled and secured to the backplate 238, as previously discussed.

Figure 3A:
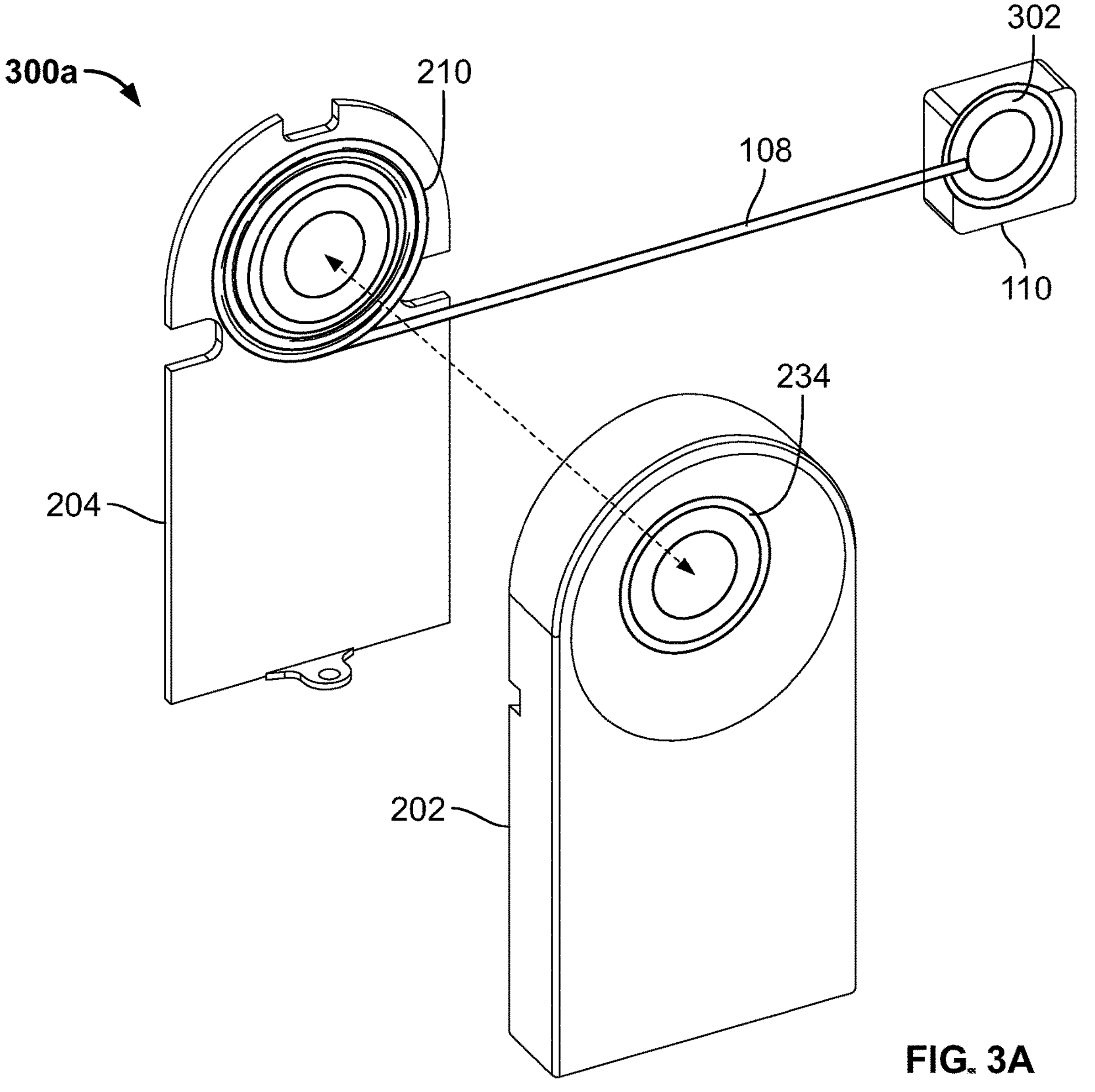
FIG. 3A illustrates an aspect of the system 300*a* in accordance with embodiments.
Figure 3B:
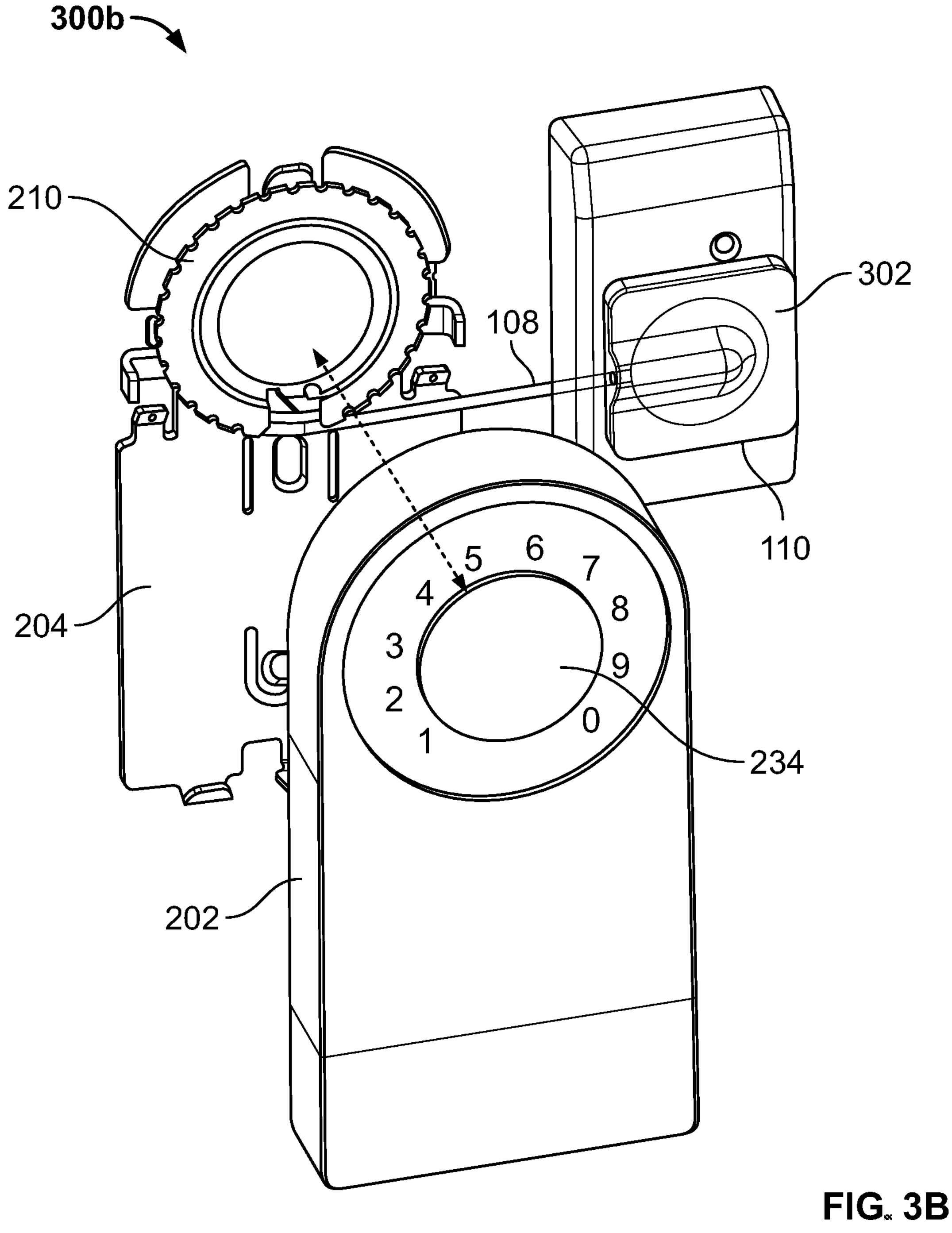
FIG. 3B illustrates an aspect of the system 300*b* in accordance with embodiments.

FIGS. 3A and 3B illustrate system diagrams 300*a* and 300*b*, including communication paths between short-range antennas. In the illustrated examples, system diagrams 300*a* and 300*b* include three antennas, short-range antenna 210, short-range antenna 234, and short-range antenna 302. As discussed, the short-range antenna 234 may be located in the faceplate 202 of the control module 104, and the short-range antenna 210 may be located on the mounting plate 204 of the control module 104. short-range antenna 302 is located within the satellite module 110. FIG. 3A, the satellite module 110 may be housed in a circular housing while in FIG. 3B, the satellite module is housed in a square housing. However, the systems of FIGS. 3A and 3B operate in a similar or same manner.

The short-range antenna 234 may be coupled physically and electrically with one or more components of the smart access control device 102, such as one more components of the host PCB 420 and the aux PCB 426.

In operation, the short-range antenna 234 may detect a device, such as a mobile device, an access card, a fob, etc., and receive data, such as authentication information, including a credential from the device. In one example, the short-range antenna 234 may be energized by a controller of the control module 104 to read data, such as the authentication information, from the other device, e.g., via an NFC exchange. The authentication information may be authenticated by the smart access control device 102. If the information is not authenticated, the smart access control device 102 may cease performing any additional access routines. If authenticated, the smart access control device 102 may generate one or more signals that may be communicated to a legacy access control device coupled with the satellite module 110. The one or more signals may include legacy authentication information, including a credential that may be provided to the legacy access reader to gain access to a space via the legacy access system.

In embodiments, the smart access control device 102 may communicate the one or more signals by energizing the short-range antenna 234 to wirelessly send the signal to the short-range antenna 210. For example, the short-range antenna 210 may be configured to detect the signals provided by the short-range antenna 234. The short-range antenna 210 may provide the signal to the satellite module 110 over cable 108. The short-range antenna 302 may receive and emit the signal, which may be read by a legacy access control device. The signal may be provided in a protocol and format that may be understood by the legacy access control system.

In embodiments, the smart access control device 102 may harvest power from the legacy access control device utilizing the same communication path, including short-range antenna 302, short-range antenna 210, and short-range antenna 234. As previously discussed, the legacy access control device may be wired to receive power continuously on a periodic basis. The short-range antenna 302 may be energized by the energy emitted by the legacy access control device, causing power to be provided to the components of the control module 104 through cable 108, the short-range antenna 210, and the short-range antenna 234. The power may be used to power one or more components of the smart access control device 102 to preserve battery life, to use the battery as a backup, and/or be a power source for the access control device 102 without the need for batteries.

In the illustrated configuration, three short-range antennas are used to communicate signals and power between components of the smart access control device 102 and the legacy access control device. The three antenna configuration enables a user to remove the faceplate 202 to replace the batteries without having to deal with or detach a cable from the mounting plate 204. In addition, the three short-range antenna configuration enables the faceplate 202 and control module 104 components to be sealed from the elements and prevent damage, as illustrated in FIG. 2D. For example, the batteries may be stored in a cavity of the carrier 228 and sealed in by the battery door 250 and battery door seal 248. Similarly, the electronic components may be secure and sealed in another body of the cavity by the chassis VHB 242 and the backplate 238. In addition, the triple coil design allows for the control module device to be completely sealed from the environment without requiring installers to form any type of seal. This allows for the device to be reliably installed and maintained without any risk of poor sealing from untrained installers.

FIG. 4A illustrates a system diagram 400 of the smart reader, such as the smart access control device 102, in accordance with embodiments of the present disclosure. In some embodiments, the smart access control device 102 can include one or more components, for example, imaging/audio sensor 402, wireless controller 404, touch controller 406, proximity controller 408, host processor 410, display controller 412, storage module 414, network controller 416, power management integrated circuit (PMIC) 418. In some embodiments, these components may be implemented and secured on a host printed circuit board (PCB) 420. The smart access control device 102 may also include other components to be configured to emulate legacy access control codes and power harvesting operations, such as an emulation controller 422 and a harvesting controller 424. These components may be included on an auxiliary (PCB) 426. Note that in some instances, all of the components may be implemented on a single PCB. In one example configuration, the host PCB 420 and components may be implemented in the lens 218, and the AUX PCB 426 and components may be implemented in PCB 220.

In addition, various components that are part of the smart access control device 102 can be implemented as hardware, software, or combinations of both. These various components can be arranged in different ways. While these various components are shown as separate, distinct components in the system diagram 400, one or more of these components can be combined and/or separated into more components. For example, the touch controller 406 and the display controller 412 can be combined to form an integrated component. As another example, the imaging/audio sensor 402 can be separated into two separate components—for example, as an imaging sensor and an audio sensor. In some embodiments, the smart access control device 102 can also include other components.

The imaging/audio sensor 402 can detect and/or capture images, videos, and audio. The imaging/audio sensor 402 can be an optical, mechanical, or another type. The detected and/or captured images, videos, and/or audio can be used for various purposes. According to some embodiments of the present disclosure, the detected/captured image, video, and/or audio can be used for authentication purposes. In some embodiments, the access control system can use biometric verification as a mechanism to authenticate a user, where the user's biometric image (e.g., the face, facial feature, retina, fingerprint), the user's biometric video (e.g., a video that includes a series of user's biometric images), and/or the user's biometric audio (e.g., the user's voice) are compared against data in the access control system.

According to some embodiments of the present disclosure, the imaging/audio sensor 402 can be used for tamper prevention purposes. In some embodiments, the imaging/audio sensor 402 can detect when the smart access control device 102 is moved. This can prevent circumvention or tampering with the security protocols running on the smart reader. For example, the imaging/audio sensor 402 can detect when the smart access control device 102 is moved in an unexpected way. In some embodiments, the imaging/audio sensor 402 can enable the smart access control device 102 to determine whether it is being tampered with, in which case the smart access control device 102 can perform different types of security and tamper prevention measures. These measures can include, for example, sending an alert to a manager of the access control system or nearby users, broadcasting an audible, visible, or other types of alerts to those nearby, deleting or encrypting sensitive data from the device itself, e.g., deleting valid credentials such as those used for accessing the access control panel and those belonging to users of the smart reader, restoring the smart reader to factory settings, capturing an image, video, and/or audio and storing that data in internal memory, and other functions which can increase the security of the access control system.

According to some embodiments of the present disclosure, the imaging/audio sensor 402 can include a camera, or can be connected to a camera. The imaging/audio sensor 402 can activate its camera in connection with tampering events to attempt to capture evidence of who is responsible for the tampering. This data can be stored locally or transmitted via a wired or wireless connection to relay this information to people or entities, such as security or management personnel, for post-incident analysis or real-time alerts and visibility. In some embodiments, the tamper prevention functionality can be made visible and/or public so that the access control system can become more secure by discouraging tampering or other negative behaviors in environments where the smart reader is installed. In other embodiments, the tamper prevention functionality can be hidden.

The wireless controller 404 can control a wireless connection with another device. In some embodiments, this wireless connection is made within a building management system that may include other components, such as cameras, smart hubs, smart locks, and so forth. In some instances, the wireless controller 404 may enable communication with the legacy access control system. For example, the wireless controller 404 can be used to connect and communicate with a component, e.g., an access control panel, of the access control system. The wireless controller 404 can also be used to connect and communicate with other devices or systems, such as an external or remote database, for authentication purposes. As another example, the wireless controller 404 can be used to connect and communicate with a user device, e.g., a user's smartphone, or a user's computer. User devices can be connected to perform various operations, including providing authentication information, such as credentials. In some embodiments, the wireless controller 404 can make either a secure or non-secure connection. In embodiments, the wireless controller 404 is configured to support one or more wireless communication protocols, such as those in accordance with the IEEE 802.11 family of standards.

In some instances, the wireless controller 404 may be configured to communicate in accordance with one or more short-range communication protocols, such as Bluetooth, ZigBee, Near Field Communication (NFC), and other standards and/or protocols. For example, the wireless controller 404 may include transceiver circuitry coupled with the short-range antenna 234 configured to communicate with other devices in accordance with one or more short-range communication protocols. In one specific example, the wireless controller 404 may be configured to retrieve or receive one or more signals, including an access credential, from one or more devices via the short-range antenna 234. The signals may be generated by another device based on the wireless controller 404 energizing the short-range antenna 234. Other devices may include mobile devices, access cards, access fobs, and so forth. The wireless controller 404 may process the signals and may provide data to one or more other components, such as the host processor 410, the emulation controller 422, and/or the harvesting controller 424 for further processing.

In embodiments, the smart access control device 102 includes the touch controller 406 (lens) configured to provide means of entering access codes. For example, the access control system may require its user to enter an access code in the form of a series of numbers. The smart reader can provide a way for the user to enter the access code, e.g., using the touchpad with numbers. The touch controller 406 can receive the user input and transmit it to the host processor 410 for further processing. For example, the host processor 410 may authenticate the access code, and when the authenticate, send one or more instructions to the emulation controller 422 to generate an emulation signal that may be communicated via the short-range antenna 234 and short-range antenna 210 and satellite module 110 to the legacy card reader.

The proximity controller 408 can support functions associated with a proximity authentication mechanism. For example, the access control system may require a user to place a proximity card close to a proximity card reader, which can be a part of the smart reader or can be a separate device. When the proximity card is placed close to the proximity card reader, the proximity controller 408 can receive authentication information from the proximity card and transmit it to host processor 410 for further processing. In some instances, the proximity controller 408 may be configured to operate in accordance with one or more of the short-range communication protocols, e.g., NFC, Bluetooth, radio frequency identification (RFID), etc.

The display controller 412 can provide means of signaling output to a user. For example, the smart reader can include or can be connected to a display, e.g., a light-emitting diode (LED) screen or a light crystal display (LCD) screen. This display can provide information, e.g., instructions, general information, a directory, and maps, to its users. The host processor 410 can retrieve data representing such information from the storage module 414 and transmit the data to the display controller 412 for outputting to the display.

The storage module 414 can store various types of data for the access control system. These data types can include, for example, authentication data associated with accessing the underlying access control system via the access control panel, authentication data associated with users of the access control system, and data required for operations of any other components of the smart reader, e.g., information outputted to the display via the display controller 412, and captured images, videos, and audio by the imaging/audio sensor 402. For example, the storage module 414 may store authentication data including one or more credentials generated and configured to operate with the smart access control device 102, e.g., a user may provide the credential to the smart access control device 102 to gain access to a space. The 414 may include a legacy credential(s) that may be configured to operate with the preexisting legacy access control system.

Some or all of the data stored in the storage module 414 can be sensitive. Thus, it can be desirable to protect some or all of the data in the storage module 414. In some embodiments, the smart access control device 102 can provide means of detecting when the smart access control device 102 is moved or tampered with. For example, the smart access control device 102 can include a tamper detection switch, which can, in turn, include a mechanical pin. The mechanical pin can be compressed and released with its relative position being provided as an input to the smart reader to switch into modes of higher security. As another example, this same functionality can be activated through the use of an optical sensor that detects changes in light or other visual indicators to detect and relay events back to the smart access control device 102. Yet in another example, this same functionality can be activated by detecting a loss of power to the smart access control device 102 and triggering a backup power source to delete or secure data as necessary. In some embodiments, the sensors used in detecting tampering can be calibrated to eliminate false positives or missed events for them to work in a wide variety of environments and mounting scenarios. In some embodiments, when tampering or movement of the smart access control device 102 is detected, the smart access control device 102 can perform data securing operations. For example, some or all of the data in the storage module 414 can be deleted, encrypted or moved to a secure element within or outside the smart access control device 102. This securing of sensitive data can prevent unauthorized data theft or data visibility and can be essential to the overall performance of the smart access control device 102.

The network controller 416 can provide means of communicating via a network connection. In some embodiments, the network controller 416 can be used in connecting and communicating with other devices within or outside the access control system. For example, the network controller 416 can be used for communicating with the access control panel.

The PMIC 418 can be used to manage power for the smart access control device 102. A power source for the smart access control device 102 can include one or more of different types, including a battery and a wired power connection. For example, the smart access control device 102 can be powered solely by a wired power connection or solely by a battery. As another example, the smart access control device 102 can be powered primarily by a wired power connection but can also include a backup battery. In some embodiments, the smart access control device 102 can leverage an existing power source of the existing access control system.

The smart access control device 102 can run in a power-efficient manner. For example, the smart access control device 102 may be put into a sleep or lower power state. This can be advantageous, especially for situations where the smart access control device 102 operates in various types of power-constrained environments. For example, the smart access control device 102 can run on battery power. As another example, the smart access control device 102 can be located in a building that is monitoring energy consumption for financial or ecological reasons.

According to some embodiments of the present disclosure, the PMIC 418 can provide mechanisms for the smart access control device 102 to run in a power-efficient manner. In some embodiments, the smart access control device 102 can operate in different states, such as in a rest (sleep) state and an active state. For example, when the smart access control device 102 is used, it can be in an active state. As another example, when the smart access control device 102 is not used or has not been used for a period of time, it can be in a rest state. In some instances, the smart access control device 102 may be put into a rest state and then periodically put into the active state. In some embodiments, one or more components of the smart access control device 102 can power down when the smart access control device 102 is in the rest state. For example, if the smart access control device 102 is not used for a prolonged period of time, the display controller 412 and/or the storage module 414 can be powered down.

In some embodiments, even when the smart access control device 102 is in the rest state, it can be desirable to have the smart access control device 102 ready to quickly power up necessary components when required by a user. For example, the smart access control device 102 may need to be able to process proximity-based or touch-based inputs in order to respond and perform the required functions in a timely fashion. In this case, components, such as the touch controller 406 or the proximity controller 408 can be kept on while some other components are powered down. The PMIC 418 can control the flow of power to one or more components of the smart access control device 102. In some embodiments, such power management can be performed at the hardware level and/or the software level.

In some instances, the smart access control device 102 may be configured to harvest power from the legacy or existing access control reader. As previously discussed, the satellite module 110 may include a coil configured to energize in the presence of an energy field generated by the legacy access control device. Power may be provided through the cable coupling the smart access control device 102 to the satellite module 110. The short-range antenna 210 and short-range antenna 234 may energize in the presence of the provided power. The smart access control device 102 including the harvesting controller 424 and/or the PMIC 418, may be configured to utilize the power provided to power the smart access control device 102. For example, the power provided may be above a threshold amount of energy required to keep the smart access control device 102 in a rest or low power state. In some instances, the smart access control device 102 may only use power provided by the battery when in the active state. Embodiments are not limited in this manner. For example, the smart access control device 102 may be configured to utilize the power provided by the battery and supplement the power with the power harvested from the legacy access control device. In either example, the power stored by the battery may be extended based on the supplemental power provided by the legacy access control device.

The host processor 410 can process instructions related to data and operations for various components in the smart access control device 102. For example, when the touch controller 406 receives a user's access code via a touchpad, the touch controller 406 can instruct the host processor 410 to determine whether the access code is valid. In this example, the host processor 410 can receive the access code from the touch controller 406 and compare the access code against a set of valid access codes stored in a database, which can reside in the storage module 414. The host processor 410 can also compare the access code against a set of valid access codes stored in an external or remote database by retrieving data from the external or remote database using the network controller 416.

In embodiments, the host PCB 420 may couple with one or more components within the smart access control device 102 not located on the host PCB 420. For example, the host PCB 420 may include an external interface bus coupled with the aux PCB 426, including the emulation controller 422 and the harvesting controller 424, and with short-range antenna 234 to provide emulation and harvesting functionality. For example, the host processor 410 may receive a signal via the short-range antenna 234 during an attempt to access a space. The host processor 410 may process the signal, including determining whether the credentials providing the signal are authentic and whether to permit or deny access to the space. When access is granted, the host processor 410 may send data to the emulation controller 422 to generate an emulation signal, including a credential authenticated with the historic access system, and the emulation controller 422 may cause the short-range antenna 234 to transmit a signal that is received by the short-range antenna 210, and further communicated to the legacy system via the satellite module 110 and short-range antenna 302.

In some embodiments, the smart access control device 102 including the host processor 410, may operate in a block mode of operation. For example, the host processor 410 may cause one or more signals to be emitted by one or more of the coils to block reading an access device, such as a mobile device, access card, fob, etc. In one example, the host processor 410 may cause the one or more blocking signals to be emitted by the short-range antenna 302 of the satellite module 110 to prevent users from presenting and communicating legacy credentials via the legacy access control reader. In some instances, when a user presents a legitimate credential via the smart access control device 102, the host processor 410 will stop the blocking mode of operation and cause the satellite module 110 to communicate a legacy credential to gain access to a space.

In embodiments, the lens 218 including the host PCB 420 is configured to operate with any number and different versions of hardware components or software components. For example, the host PCB 420 may be configured to operate with current and legacy versions of the system, such as current or legacy controllers 422 and 424, and antennas 234, 210, and 302.

In embodiments, the host processor 410 is configured to determine which version of hardware and/or software it is coupled with to ensure proper operation. Embodiments discussed herein utilize a signaling technique for the lens 218 to determine a version of coupled hardware when the lens 218 is attached to the AUX PCB 426 and other components. Specifically, the host PCB 420 including the host processor 410 may be configured to send an input signal on an input pin of circuitry on the AUX PCB 426 having a specified pulse width and reading an output pin of the circuitry to determine an output pulse width. Based on the output pulse width, the host PCB 420 including the host processor 410 can determine the version of hardware attached to the lens 218. Different versions of hardware will have different output pulse widths based on the configuration of the circuitry.

Figure 4C:
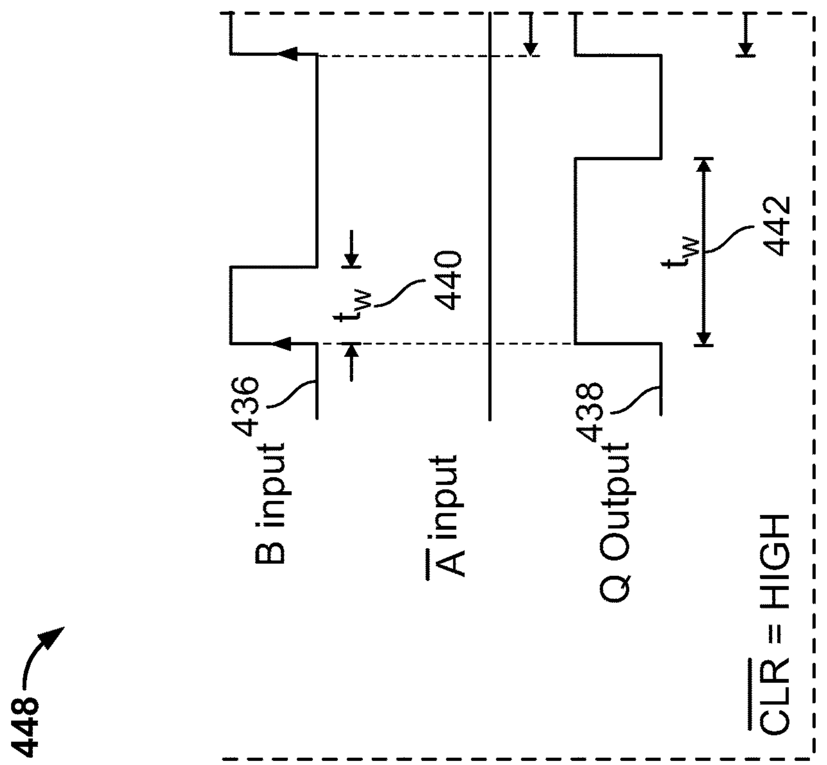
FIG. 4C illustrates an example of a timing diagram 454 in accordance with embodiments.
Figure 4B:
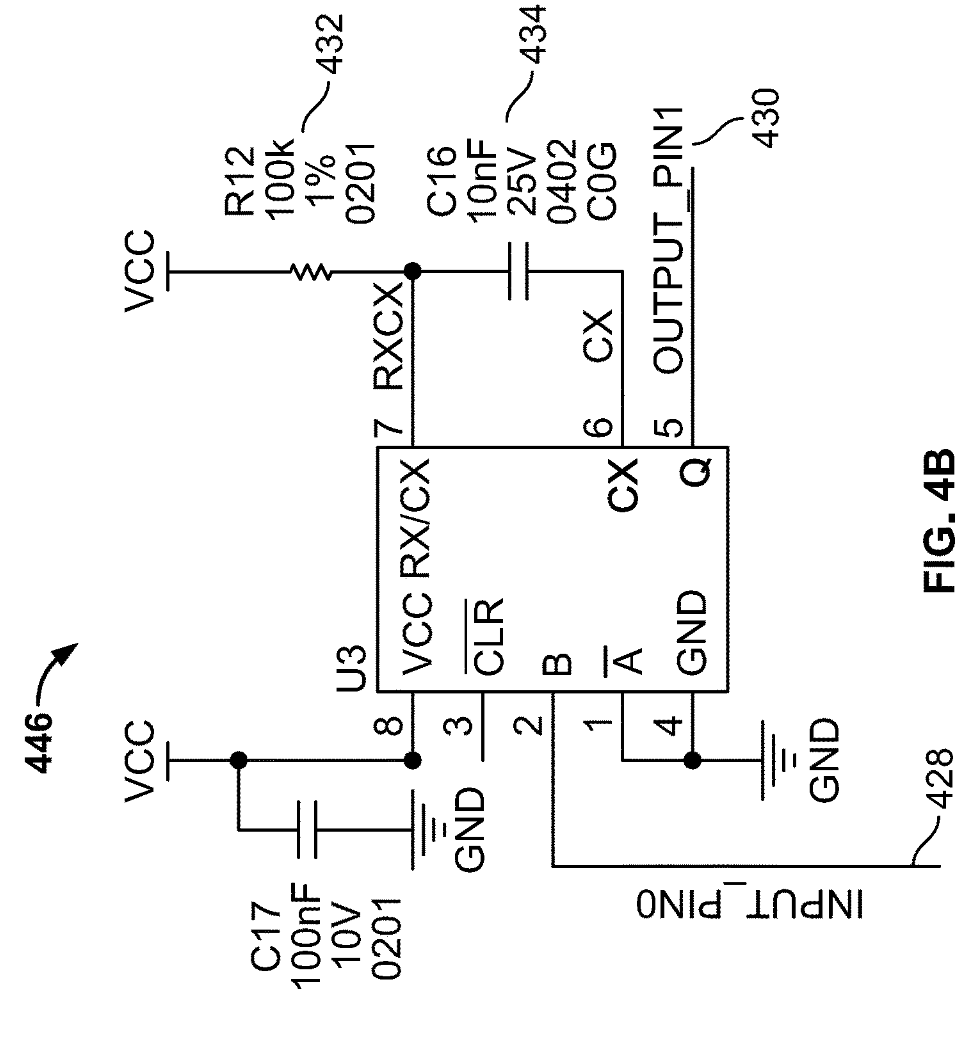
FIG. 4B illustrates an example of a circuit 452 to determine hardware component versions in accordance with embodiments.

FIG. 4B illustrates an example of a circuit 446 that may be incorporated into hardware of the system, such as on PCB 220 (AUX PCB 426) and is configured to couple to pins of the host processor 410 of the lens 218. The implementation described herein with respect to FIGS. 4B through 4D implements circuitry and logic to determine versions of hardware components and provides advantages over previous solutions by enabling the host PCB 420 and host processor 410 to determine the version while only utilizing a minimal number of pins, e.g., two pins. Traditionally, a number of pins would be used to create a binary versioning system, e.g., four pins allow for 2^4 (16) versions when utilizing their HIGH and LOW states. Embodiments, described herein only utilize two digital pins for 10+ versions by using a time based approach.

In FIG. 4B, the circuit 446 may be implemented in the PCB 220/AUX PCB 426. In one example the circuitry is a monostable multivibrator having a number of input/output (I/O) pins. The I/O pins may include, among others, an input pin 428, and an output pin 430, which may couple with the host PCB 420 and the host processor 410 of a lens 218. Specifically, the host processor 410 may provide an input signal on the input pin 428 and read an output signal on the output pin 430.

In embodiments, the pulse width of the output signal may be configured by changing the values of resistor 432, and capacitor 434, individually or in combination. Thus, different values may be chosen for resistor 432, capacitor 434, or both to affect the pulse width and to indicate which version lens 218 is coupled with the host PCB 420. Thus, for each version of hardware installed in the system, different values for resistor 432 and/or capacitor 434 may be selected to provide different pulse width outputs that are detectable by the lens 218.

In embodiments, an output pulse width may be predetermined and correspond with a specific hardware configuration and stored in memory of the host PCB 420. Thus, the host PCB 420 including the host processor 410 may determine the pulse width and determine the hardware version based on data store in the memory. Based on the determined version of hardware, the host processor 410 may change one or more configurations to ensure proper operation between the lens 218 and the hardware.

FIG. 4C illustrates an example of a timing diagram 448 in accordance with embodiments. As mentioned, the host processor 410 may provide an input signal 436 on input pin 428 having a specified input pulse width 440. The circuit 446 including the resistor 432 and capacitor 434 is set in a predetermined configuration, and based on the configuration, the output signal 438 will have an output pulse width 442 of a specific width. The host processor 410 will determine the width and determine the corresponding version identifier (ID) for the hardware.

Figure 4D:
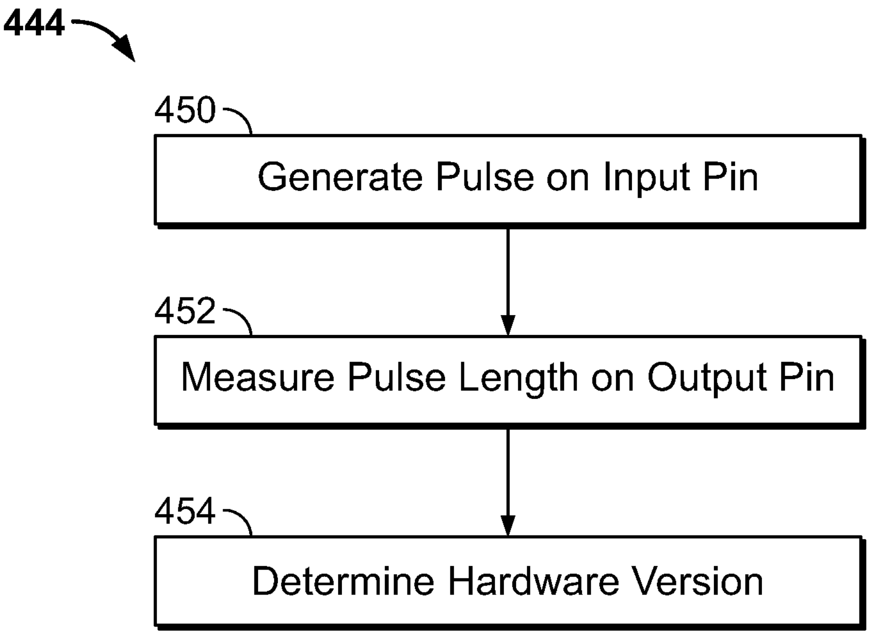
FIG. 4D illustrates an example of a processing flow 450 in accordance with embodiments.

FIG. 4D illustrates an example of a processing flow 444 in accordance with embodiments. At block 450, the host processor 410 may generate a pulse on the input pin 428 of the 446 of the hardware. A rising edge signal at input pin 428 triggers a pulse of fixed length at the output pin 430. At block 452, the host processor 410 may measure the pulse length. As mentioned, the pulse length is determined by the combination of resistor 432 and capacitor 434. Hardware revisions can change the Hardware Version ID by changing the resistor 432 and capacitor 434 to increase or decrease the pulse length. The host processor 410 may measure the pulsed and determine the version ID at block 454.

Figure 5:
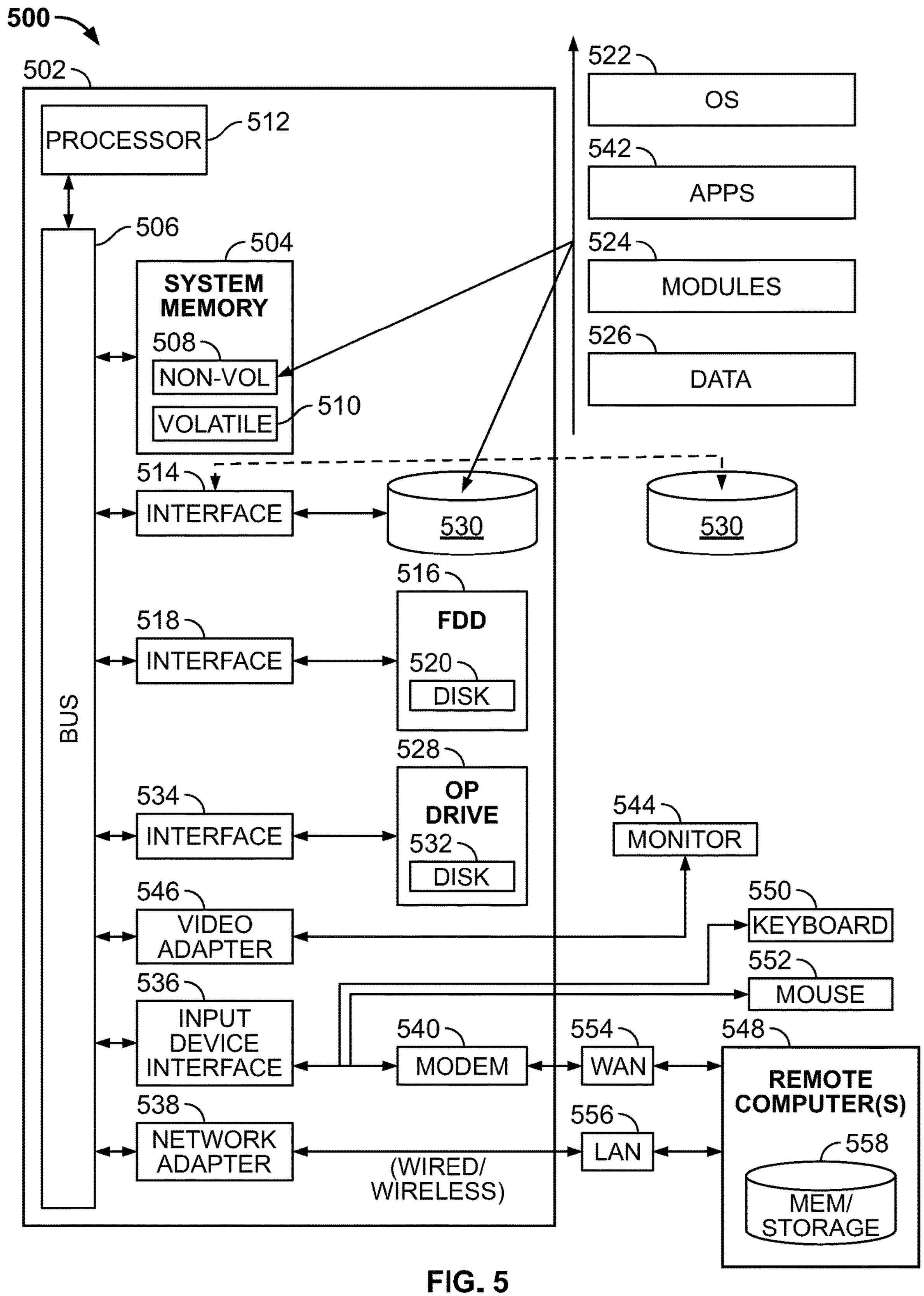
FIG. 5 illustrates a computer architecture 500 in accordance with one embodiment.

FIG. 5 illustrates an embodiment of an exemplary computer architecture 500 suitable for implementing various embodiments as previously described. As used in this application, the terms "system" and "component" are intended to refer to a computer-related entity, either hardware, a combination of hardware and software, software, or software in execution, examples of which are provided by the exemplary computing computer architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processor 512, a system memory 504 and a system bus 506. The processor 512 can be any of various commercially available processors.

The system bus 506 provides an interface for system components including, but not limited to, the system memory 504 to the processor 512. The system bus 506 can be any of several types of bus structure that may further interconnect to a memory bus (with or without a memory controller), a peripheral bus, and a local bus using any of a variety of commercially available bus architectures. Interface adapters may connect to the system bus 506 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 504 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 504 can include non-volatile 508 and/or volatile 510. A basic input/output system (BIOS) can be stored in the non-volatile 508.

The computer 502 may include various types of computer-readable storage media in the form of one or more lower speed memory units, including an internal (or external) hard disk drive 530, a magnetic disk drive 516 to read from or write to a removable magnetic disk 520, and an optical disk drive 528 to read from or write to a removable optical disk 532 (e.g., a CD-ROM or DVD). The hard disk drive 530, magnetic disk drive 516 and optical disk drive 528 can be connected to system bus 506 the by an HDD interface 514, and FDD interface 518 and an optical disk drive interface 534, respectively. The HDD interface 514 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 508, and volatile 510, including an operating system 522, one or more applications 542, other program modules 524, and program data 526. In one embodiment, the one or more applications 542, other program modules 524, and program data 526 can include, for example, the various applications and/or components of the system diagram 400.

A user can enter commands and information into the computer 502 through one or more wire/wireless input devices, for example, a keyboard 550 and a pointing device, such as a mouse 552. Other input devices may include microphones, infra-red (I.R.) remote controls, radio-frequency (R.F.) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 512 through an input device interface 536 that is coupled to the system bus 506 but can be connected by other interfaces such as a parallel port, IEEE 1394 serial port, a game port, a USB port, an I.R. interface, and so forth.

A monitor 544 or other type of display device is also connected to the system bus 506 via an interface, such as a video adapter 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory and/or storage device 558 is illustrated. The logical connections depicted include wire/wireless connectivity to a local area network 556 and/or larger networks, for example, a wide area network 554. Such LAN and WAN networking environments are commonplace in offices and companies, and facilitate enterprise-wide computer networks, such as intranets, all of which may connect to a global communications network, for example, the Internet.

When used in a local area network 556 networking environment, the computer 502 is connected to the local area network 556 through a wire and/or wireless communication network interface or network adapter 538. The network adapter 538 can facilitate wire and/or wireless communications to the local area network 556, which may also include a wireless access point disposed thereon for communicating with the wireless functionality of the network adapter 538.

When used in a wide area network 554 networking environment, the computer 502 can include a modem 540, or is connected to a communications server on the wide area network 554 or has other means for establishing communications over the wide area network 554, such as by way of the Internet. The modem 540, which can be internal or external and a wire and/or wireless device, connects to the system bus 506 via the input device interface 536. In a networked environment, program modules depicted relative to the computer 502, or portions thereof, can be stored in the remote memory and/or storage device 558. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
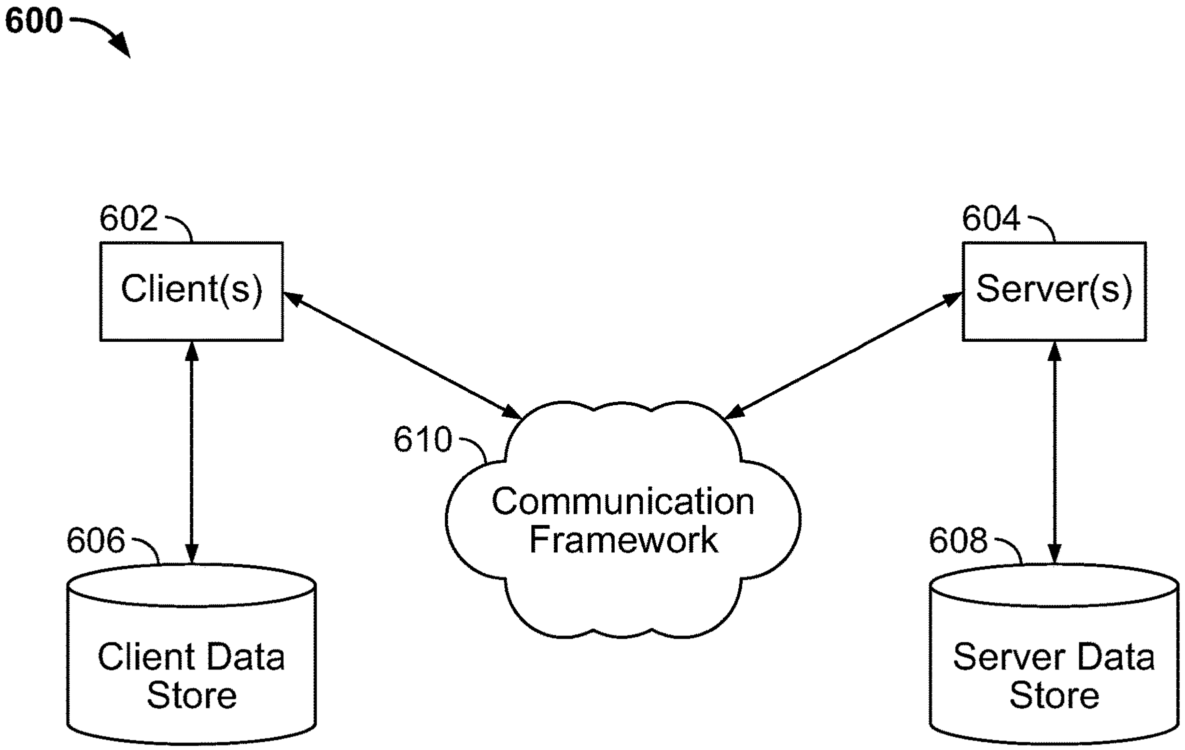
FIG. 6 illustrates a communications architecture 600 in accordance with one embodiment.

FIG. 6 is a block diagram depicting an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600, which may be consistent with computer architecture 500.

As shown in FIG. 6, the communications architecture 600 includes one or more client(s) 602 and server(s) 604. The client(s) 602 and the server(s) 604 are operatively connected to one or more respective client data store 606 and server data store 608 that can be employed to store information local to the respective client(s) 602 and server(s) 604, such as cookies and/or associated contextual information.

The client(s) 602 and the server(s) 604 may communicate information between each other using a communication framework 610. The communication framework 610 may implement any well-known communications techniques and protocols. The communication framework 610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 602 and the server(s) 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 7:
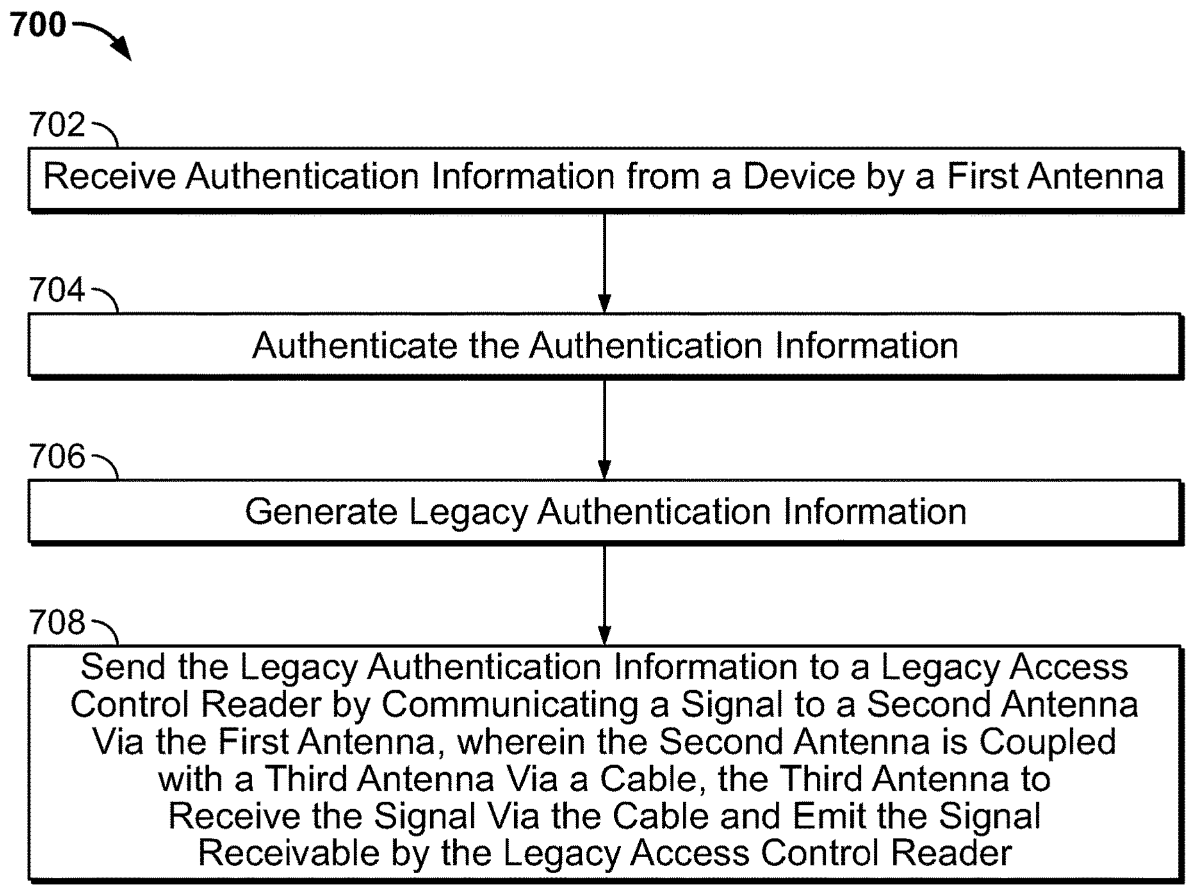
FIG. 7 illustrates a routine 700 in accordance with embodiments.
Figure 8:
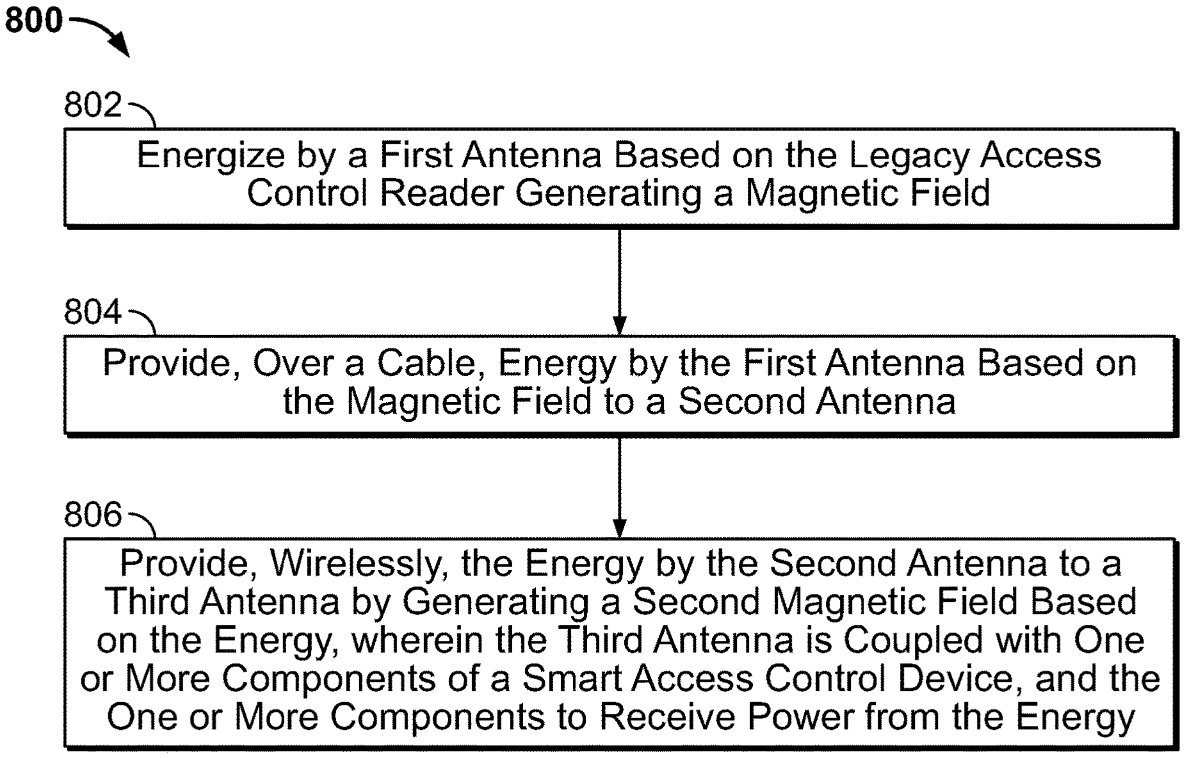
FIG. 8 illustrates a routine 800 in accordance with embodiments.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit." In embodiments, the systems, components, and devices described herein may be utilized to perform one or more operations to enable new smart access control devices to operate in legacy access control systems with minimal installation. FIGS. 7 and 8 illustrate two possible processing flows that may be performed with the hardware described herein.

FIG. 7 illustrates an example routine 700 that may be performed by one or more devices discussed herein to authenticate a user with a smart access control device operable in a legacy access control system.

In block 702, the routine 700 includes receiving authentication information from a device by a first antenna. For example, a user may bring a wireless communication device, such as an access card or the like, within the wireless communication range of the control module 104, including a short-range antenna. The device may communicate the authentication information to the control module 104 via the short-range antenna in one or more signals. In some instances, the control module 104, including the short-range antenna, may detect the device via a load placed on the antenna and initiate a communication exchange with the device to read the authentication information.

In block 704, the routine 700 includes authenticating the authentication information. For example, the control module 104 may compare the received authentication information to a stored authentic credential. If they match, the control module 104 authenticates the authentication information. However, if they do not match, the authentication information is not authenticated. In embodiments, the control module 104 may be in communication with another system to perform the authentication of the authentication information. The control module 104 may communicate the authentication information to the system and receive an indication as to whether the authentication information is authenticated or not.

In block 706, the routine 700 includes generating legacy authentication information. For example, the control module 104 may generate a code or any type of data that may be used by the legacy system to authenticate the user and/or perform the desired function, e.g., enable access to a space. The legacy authentication information may be generated in a format that is readable by the legacy system.

In block 708, the routine 700 includes sending the legacy authentication information to a legacy access control reader by communicating a signal to a second antenna via the first antenna, wherein the second antenna is coupled with a third antenna via a cable, the third antenna to receive the signal via the cable and emit the signal receivable by the legacy access control reader. For example, the control module 104 may cause the first short-range antenna to emit one or more signals that are detectable by a second short-range antenna. The second short-range antenna may be physically coupled with a satellite module via a cable. The satellite module may include a third short-range antenna configured to emit the signal to the legacy authentication system.

FIG. 8 illustrates an example routine 800 that may be performed by one or more devices discussed herein to harvest power from a legacy access control system.

In block 802, the routine 800 includes energizing by a first antenna based on the legacy access control reader generating a magnetic field. For example, the legacy access control reader may periodically energize to determine whether there are any readable devices within a communication range. However, embodiments are not limited to this example, and the legacy access controller reader may turn on for any number of reasons.

In block 804, the routine 800 includes providing, over a cable, energy by the first antenna based on the magnetic field to a second antenna. For example, the energy may be a current induced on the cable.

In block 806, the routine 800 includes providing, wirelessly, the energy by the second antenna to a third antenna by generating a second magnetic field based on the energy, wherein the third antenna is coupled with one or more components of a smart access control device, and the one or more components to receive power from the energy.

Figure 9B:
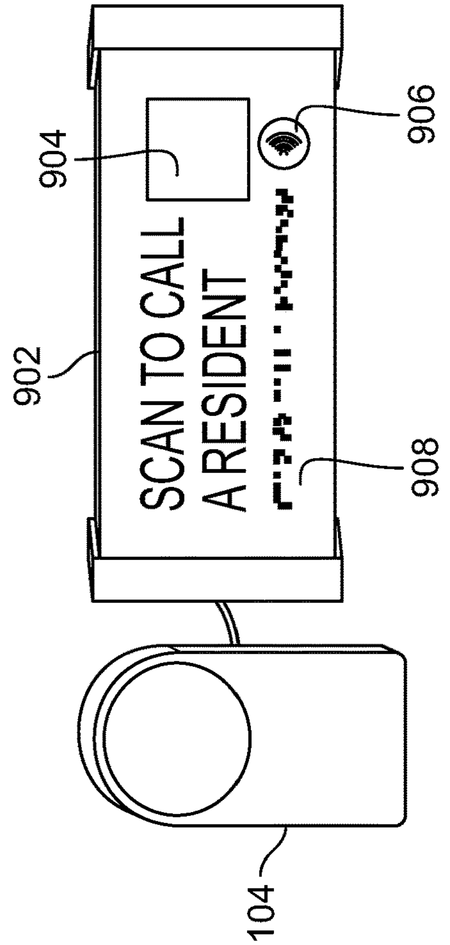
FIGS. 9A/9B illustrate example configurations of a plaque or placard 902 in accordance with embodiments.
Figure 9A:
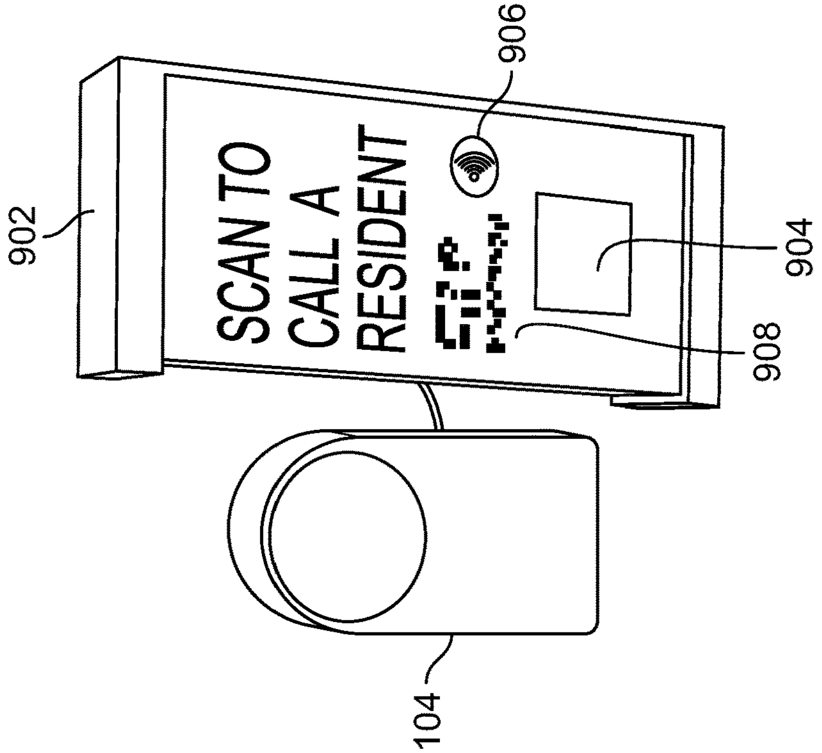

FIGS. 9A/9B illustrates examples of a placard 902 configured to be placed over and hide the legacy access control device. In embodiments, the placard 902 may include a cavity on the backside that is configured to fit over the legacy access control device and a satellite module placed on the legacy access control device, for example.

As previously mentioned, the placard 902 can include information, such as instructions to scan a device on or near the control module 104 or the placard 902. The placard 902 can be made of a plastic material, such as a high density polyethylene material. However, embodiments are not limited in this manner. The placard 902 can be made to be Americans with Disabilities Act (ADA) compliant, including the braille 908 instructions, that may be used by a handicap person.

In some embodiments, the placard 902 may include additional features, such as a scannable item 904 and a wireless tag 906 that may be used by a user to launch or access an application on a device. For example, the user may use a mobile device to scan the scannable item 904 or read the wireless tag 906 to initiate a virtual intercom application on the user's mobile device, as discussed in U.S. patent application Ser. No. 17/085,160. The virtual intercom application may be used to speak with a person associated with a space and unlock a smart access control device for a guest or delivery.

As illustrated in FIGS. 9A and 9B, the placard 902 can be installed both vertically and horizontally by switching the positioning of the retaining brackets. The brackets can be attached to the wall via VHB tape, glue or screws. The height (cavity) of the brackets is intended to give clearance to cover the existing access control reader and the satellite module. In some instances, the placard can also be taped, glued, or screwed flat onto the wall without brackets and embodiments are not limited in this manner.

With general reference to notations and nomenclature used herein, the detailed descriptions herein may be presented in terms of program procedures executed on a computer or network of computers. These procedural descriptions and representations are used by those skilled in the art to convey the substance of their work most effectively to others skilled in the art.

A procedure is here, and generally, conceived to be a self-consistent sequence of operations leading to the desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more exemplary embodiments. Rather, the operations are machine operations. Useful machines for performing operations of various embodiments include general-purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
- receiving, by a first antenna, energy via a cable coupled with a second antenna, wherein the second antenna generates the energy in response to detecting a magnetic field;
- energizing, by the first antenna, a third antenna with the energy received from the second antenna, the third antenna to provide power to one or more components of a smart access control device; and
- receiving, by the smart access control device, authentication information when powered by the third antenna.

2. The computer-implemented method of claim 1, comprising authenticating the authentication information and determining legacy authentication information to provide to a legacy access control reader via the first antenna, the second antenna, and the third antenna.

3. The computer-implemented method of claim 2, comprising sending the legacy authentication information to the legacy access control reader by communicating the legacy authentication information in one or more signals to the first antenna via the third antenna, and to the second antenna via the cable, the second antenna to receive corresponding signals based on one or more signals and emit signals receivable by the legacy access control reader.

4. The computer-implemented method of claim 2, wherein authenticating the authentication information comprises determining the authentication information matches a stored access credential.

5. The computer-implemented method of claim 2, wherein authenticating the authentication information comprises:
- sending the authentication information to an authentication system; and receiving a response indicating the authentication information is authenticated.

6. The computer-implemented method of claim 2, wherein the legacy authentication information and the authentication information are different, and the legacy authentication information is securely stored in memory of another device.

7. The computer-implemented method of claim 6, comprising receiving, via an input, the legacy authentication information or receiving, via an interface, the legacy authentication information from a legacy access card, a mobile device, or a legacy fob.

8. The computer-implemented method of claim 3, comprising emitting, by the second antenna, the signals in accordance with a protocol of the legacy access control reader.

9. The computer-implemented method of claim 1, wherein the first antenna and the second antenna are comprised in a first housing and the third antenna is comprised in a second housing.

10. The computer-implemented method of claim 9, wherein the second housing is physically coupled to a legacy access control reader.

11. The computer-implemented of method of claim 1, comprising storing, by circuitry, the power in a battery store.

12. The computer-implemented of method of claim 1, wherein the energy is generated by a legacy access control reader.

13. The computer-implemented of method of claim 1, wherein the energy is generated periodically.

14. A smart access control system configured to operate with a legacy access control reader, comprising:
- a control module comprising one or more components, a first antenna, and a second antenna; and
- a satellite module comprising a third antenna, wherein the satellite module is configurable to be physically affixed to a legacy access card reader, and
- wherein the third antenna is capable of detecting a magnetic field generated by the legacy access card and generating energy,
- wherein the first antenna is capable of receiving the energy via a cable coupled with the third antenna and energizing the second antenna wirelessly, and
- wherein the second antenna is capable of providing power to the one or more components.

15. The smart access control system of claim 14, wherein the one more components comprise a memory and processing circuitry, the memory and the processing circuitry capable of authenticating authentication information and determining legacy authentication information to provide to a legacy access control reader via the first antenna, the second antenna, and the third antenna.

16. The smart access control system of claim 15, wherein the memory and the processing circuitry are further capable of sending the legacy authentication information to the legacy access control reader by communicating the legacy authentication information in one or more signals to the first antenna via the second antenna, and to the third antenna via the cable.

17. The smart access control system of claim 14, wherein the control module comprises a first housing comprising a faceplate and a mounting plate, the faceplate comprising a cavity to house the one or more components, the first antenna, and the second antenna, and the mounting plate affixable to a surface.

18. The smart access control system of claim 16, wherein the first antenna, the second antenna, and the third antenna are configured to communicate the one or more signals wirelessly.

19. The smart access control system of claim 17, wherein the second antenna and the third antenna are coupled via the cable configured to communicate at least a portion of one or more signals.

20. The smart access control system of claim 14, comprising circuitry configured to detect a version of one or more hardware components, and set one or more settings or configurations based on the version detected.

* * * * *